United States Patent [19]

Hanschen et al.

[11] Patent Number: 5,468,428
[45] Date of Patent: Nov. 21, 1995

[54] SPATIALLY MODIFIED ELASTIC LAMINATES

[75] Inventors: Thomas P. Hanschen, St. Paul, Minn.; Dennis L. Krueger, Hudson, Wis.; Gregory P. Karp, Brooklyn Park, Minn.

[73] Assignee: Minnesota Mining and Manufacturing Company, St. Paul, Minn.

[21] Appl. No.: 252,898

[22] Filed: Jun. 2, 1994

Related U.S. Application Data

[62] Division of Ser. No. 502,330, Mar. 30, 1990, Pat. No. 5,344,691.

[51] Int. Cl.$^6$ ................................................ B29C 35/02
[52] U.S. Cl. ............... 264/483; 264/210.7; 264/235.6; 264/288.4; 264/289.3; 264/174.1
[58] Field of Search ................... 264/22, 171, 210.7, 264/235.6, 288.4, 289.3

[56] References Cited

U.S. PATENT DOCUMENTS

| | | | |
|---|---|---|---|
| 3,265,765 | 8/1966 | Holden et al. | 260/876 |
| 3,365,315 | 1/1968 | Beck et al. | 106/40 |
| 3,479,425 | 11/1969 | Lefeure et al. | 264/171 |
| 3,557,265 | 1/1971 | Chisholm et al. | 264/47 |
| 3,562,356 | 2/1971 | Nyberg et al. | 260/876 |
| 3,694,815 | 10/1972 | Burger | 2/224 A |
| 3,700,633 | 10/1972 | Wald et al. | 260/880 B |
| 3,800,796 | 4/1974 | Jacob | 128/284 |
| 4,116,917 | 9/1978 | Eckert | 260/33.6 AQ |
| 4,152,387 | 5/1979 | Cloeren | 264/171 |
| 4,156,673 | 5/1979 | Eckert | 260/33.6 AQ |
| 4,177,812 | 12/1979 | Brown et al. | 128/284 |
| 4,197,069 | 4/1980 | Cloeren | 425/131.1 |
| 4,227,952 | 10/1980 | Sabee | 156/164 |
| 4,386,125 | 5/1983 | Shiraki et al. | 428/36 |
| 4,435,141 | 3/1984 | Weisner et al. | 425/131.1 |
| 4,476,180 | 10/1984 | Wnuk | 428/220 |
| 4,681,580 | 7/1987 | Reising et al. | 604/385 A |
| 4,710,189 | 12/1987 | Lash | 604/385 A |
| 4,767,726 | 8/1988 | Marshall | 501/33 |
| 4,778,701 | 10/1988 | Pape et al. | 428/40 |
| 4,813,947 | 3/1989 | Korpman | 604/387 |
| 4,834,820 | 5/1989 | Kondo et al. | 156/733 |

FOREIGN PATENT DOCUMENTS

| | | |
|---|---|---|
| 2160473 | 5/1984 | United Kingdom . |
| 2190406 | 4/1987 | United Kingdom . |

Primary Examiner—James J. Bell
Attorney, Agent, or Firm—Gary L. Griswold; Walter N. Kim; William J. Bond

[57] ABSTRACT

Microtextured elastomeric laminates comprising at least one elastomeric layer and at least one thin skin layer is preferably prepared by coextrusion of the layers followed by stretching the laminate past the elastic limit of the skin layers in predetermined regions of the laminate and then allowing the laminate to recover in these regions.

8 Claims, 11 Drawing Sheets

SPATIALLY MODIFIED ELASTIC LAMINATES

This is a division of application No. 07/502,330, Mar. 30, 1990 now U.S. Pat. No. 5,344,691.

FIELD OF THE INVENTION

The invention concerns elastomeric films and more specifically concerns an improved elastomeric laminate.

BACKGROUND

Elastomeric films have for some time been used and discussed in the literature with regard to their applications in disposable products, such as baby diapers and adult incontinent devices. These elastomeric webs or films are used primarily in the body hugging portions of garments. In diapers, for example, elastomeric bands are typically used in the waistband portions such as discussed in U.S. Pat. No. 4,681,580, issued to Reising et al., and Lash, U.S. Pat. No. 4,710,189. Both of these patents describe the use of elastomeric materials which have a heat stable and a heat unstable form. The heat unstable form is created by stretching the material when heated around its crystalline or second phase transition temperature followed by a rapid quenching to freeze in the heat unstable extended form. The heat unstable elastomeric film can then be applied to the, e.g., diaper and then heated to its heat stable elastomeric form. This will then result in a desirable shirring or gathering of the waistband of the diaper. A problem with these materials, other than cost, is the fact that the temperature at which the material must be heated to release the heat unstable form is an inherent and essentially unalterable property of the material to be used. This extreme inflexibility can cause severe problems. First, it is more difficult to engineer the . other materials with which the waistband is associated so that they are compatible with the temperature to which the elastomeric member must be heated in order to release the heat unstable form. Frequently this temperature is rather high which can.potentially cause significant problems with the adhesive used to attach the elastomeric waistband, or, e.g., the protective back sheet or top sheet of the diaper. Further, once chosen the elastomer choice can constrain the manufacturing process rendering it inflexible to lot variations, market availability and costs of raw materials (particularly elastomer(s)), customer demands, etc.

Other materials and methods have been proposed. For example, Berger, U.S. Pat. No. 3,694,815, proposed a method for attaching a stretched relaxed elastic ribbon to a garment by stretching conventional elastic ribbons and immediately freezing the elastomeric material at relatively extreme low temperatures (e.g., well below ambient). This process would obviously severely constrain the processing conditions and materials which could be used when attaching the elastomeric strand to its backing. UK Pat. Application 2190406 A proposed maintaining a conventional elastomer in a stretched condition, while attaching it to the member to be shirred (e.g., a diaper), by a rigidifying member, which would then be removed or destroyed following the attachment procedure. As described, the elastomers are first stretched then applied to the rigidifying member in its stretched form. Finally, Matray et al., UK Pat. 2,160,473, proposes an elastomer which will shrink at an elevated temperature (e.g., at or above 175° F. or 79.4° C). The allegedly novel feature of this material, compared to the heat shrink materials discussed above, is that it does not require preheating during the stretching operation but rather could be stretched at ambient temperatures by a differential speed roll process or by "cold rolling". The polymer proposed was a copolymer having alternating segments of polyamidepolyether block polymers, commercially available under the trade name Pebax, particularly Pebax Extrusion grades 2533 and 3533. As an alternative, this patent application proposed placing a thin EVA(ethylene vinyl acetate) layer(s) over the elastomer by, e.g., coextrusion. The skin layer is chosen to prevent blocking or to be compatible with a later applied adhesive. It was noted that this layer can also produce a pleasing hand, but should not interfere with heat shrinkability.

Problems with these elastomeric films include the difficulties inherent in applying a stretched elastic member to a flexible substrate such as a disposable diaper. Although some of the elastomers proposed have the advantage that they can be applied at ambient conditions in a heat stretched unstable form, subsequent, often extreme, heating is required to release the heat unstable form to a contracted heat stable form. The temperature of this heat release is generally inflexible as it is determined at the molecular level of the elastomer. As such, the other materials applied to the elastomer, and the process conditions at which the elastomer is used, must be carefully selected to be compatible with this heating step.

Elastomers also exhibit relatively inflexible stress/strain characteristics which cannot be chosen independently of the activation temperature. Materials with a high modulus of elasticity are uncomfortable for the wearer. Problems with a relatively stiff or high modulus of elasticity material can be exaggerated by the coefficient of friction and necking of the elastomer which can cause the material to bite or grab the wearer.

In copending application Set. No. 07/438,593, filed Nov. 17, 1989, having a common assignee, there is disclosed an elastomeric laminate having at least one elastomeric layer and at least one skin layer which addresses the above problems in the art. In addition, the laminate has extremely useful and novel properties. When cast, or after formation, the elastomeric laminate is substantially inelastic. Elasticity can be imparted to the inelastic laminate by stretching the laminate, by at least a minimum activation stretch ratio, wherein an elastomeric material will form immediately, over time or upon the application of heat. The method by which the elastomeric material is formed can be controlled by a variety of means. After the laminate has been converted to an elastomer, there is formed a novel texture in the skin layer(s) that provides significant advantages to the elastomeric laminate.

Despite the numerous advantages in the materials of the copending application, there is room for improvement for some applications. In order to activate the nonelastomeric laminate into a state that will allow it to recover and become elastomeric, the laminate must be stretched a substantial amount for many materials contemplated as useful for the skin and core layers. This is problematic for some applications where low activation stretch ratios for the laminate would be desirable or where it is desired to obtain elasticity in specified areas.

The desirability of obtaining elasticity in specified areas of a ribbon or tape-like substrate is illustrated by U.S. Pat. Nos. 3,800,796, 4,834,820, 4,778,701 and 4,227,952, which disclose the use of composite materials designed to have specified areas of elasticity for use in diaper systems. However, these composites require complicated construction mechanisms to bring the diverse elements of the composite together and/or special procedures for their manufacture and use that limits their general applicability.

SUMMARY OF THE INVENTION

The present invention relates to improved non-tacky, microtextured, multi-layer elastomeric laminates. The laminates of the present invention are comprised both of an elastomeric polymeric core layer(s), which provides elastomeric properties to the laminate and one or more polymeric skin layers, which are capable of becoming microtextured at specified areas along the laminate length. The microtextured areas will correspond to sections of the laminate that have been activated from an inelastic to an elastomeric form. In preferred embodiments of the present invention, the skin layer further can function to permit controlled recovery of the stretched elastomer, modify the modulus behavior of the elastomeric laminate and/or stabilize the shape of the elastomeric laminate (e.g., by controlling further necking). Laminates can be prepared by coextrusion of the selected polymers or by application of one or more elastomer layer(s) onto one or more already formed skin layer(s). Coextrusion is preferred. The novel, non-tacky microtextured laminate is obtained by stretching the laminate past the elastic limit of predetermined regions of the skin layers. This is termed selective or preferential activation. The laminate then recovers in these predetermined regions, which can be instantaneous, over an extended time period, which is skin layer controllable, or by the application of heat, which is also skin layer controllable.

This selective or preferential activation is produced by controlling the relative elastic modulus values of selected cross-sectional areas of the laminate to be less than modulus values of adjacent cross-sectional areas. The areas controlled to have reduced modulus will preferentially yield when subjected to stress. This will result in either preferential elastization of specified zones or fully elasticized laminates with higher strain regions, depending on the location of the areas of low modulus and the manner of stretch. Alternatively, the laminate could be treated to enhance or concentrate stress in selected regions. This will yield essentially the same results as providing low modulus regions. By either construction, the laminate can activate in selected regions at lower stretch ratios than would normally be required activate the entire laminate.

The modulus can be controlled by providing one or more layers of the laminate with relatively low and high modulus areas. This can be accomplished by selectively altering the physical or chemical characteristics of regions of one or more layers or by providing a layer(s) with regions of diverse chemical composition. Regionally enhanced stress can be induced by physical or chemical treatment of a layer(s) such as by ablation, scoring, corona treatment or the like.

DETAILED DESCRIPTION OF PREFERRED EMBODIMENTS OF THE INVENTION

Figure 1:
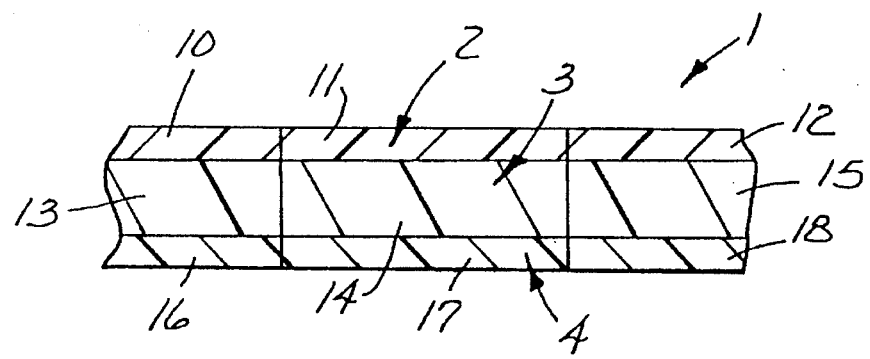
FIG. 1 is a cross-sectional segment of an extruded laminate of the invention before microstructuring.

The present invention relates broadly to novel non-tacky, multi-layer elastomeric laminates comprising at least one elastomeric layer and at least one relatively nonelastomeric skin layer. The selected regions of the skin layer are stretched beyond their elastic limit and relaxed with the core so as to form an elastic region having a microstructured skin layer. Microstructure means that the layer contains peak and valley irregularities or folds which are large enough to be perceived by the unaided human eye as causing increased opacity over the opacity of the laminate before microstructuring, and which irregularities are small enough to be perceived as smooth or soft to human skin. Magnification of the irregularities is required to see the details of the microstructured texture.

The elastomer can broadly include any material which is capable of being formed into a thin film layer and exhibits elastomeric properties at ambient conditions. Elastomeric means that the material will substantially resume its original shape after being stretched. Further, preferably, the elastomer will sustain only small permanent set following deformation and relaxation which set is preferably less than 20 percent and more preferably less than 10 percent of the original length at moderate elongation, e.g., about 400–500%. Generally, any elastomer is acceptable which is capable of being stretched to a degree that causes relatively consistent permanent deformation in a relatively inelastic skin layer. This can be as low as 50% elongation. Preferably, however, the elastomer is capable of undergoing up to 300 to 1200% elongation at room temperature, and most preferably up to 600 to 800% elongation at room temperature. The elastomer can be both pure elastomers and blends with an elastomeric phase or content that will still exhibit substantial elastomeric properties at room temperature.

As discussed above, heat-shrinkable elastics have received considerable attention due to the ability to fabricate a product using the unstable stretched elastomer at ambient conditions and then later applying heat to shirr the product. Although these elastomers are contemplated for use in the present invention, other non-heat-shrinkable elastomers can be used while retaining the advantages of heat shrinkability with the added dimension of the possibility of substantially controlling the heat shrink process. Non-heat-shrinkable means that the elastomer, when stretched, will substantially recover sustaining only a small permanent set as discussed above. Therefore, the elastomeric layer can be formed from non-heat-shrinkable polymers such as block copolymers which are elastomeric such as those known to those skilled in the art as A-B or A-B-A block copolymers. These block copolymers are described, for example, in U.S. Pat. Nos. 3,265,765; 3,562,356; 3,700,633; 4,116,917 and 4,156,673, the substance of which are incorporated herein by reference. Styrene/isoprene, butadiene or ethylene-butylene/styrene (SIS, SBS or SEBS) block copolymers are particularly useful. Other useful elastomeric compositions can include elastomeric polyurethanes, ethylene copolymers such as ethylene vinyl acetates, ethylene/propylene copolymer elastomers or ethylene/propylene/diene terpolymer elastomers. Blends of these elastomers with each other or with modifying non-elastomers are also contemplated. For example, up to 50 weight percent, but preferably less than 30 weight percent, of polymers can be added as stiffening aids such as polyvinylstyrenes, polystyrenes such as poly(alpha-methyl-)styrene, polyesters, epoxies, polyolefins, e.g., polyethylene or certain ethylene vinyl acetates, preferably those of higher molecular weight, or coumarone-indene resin. The ability to use these types of elastomers and blends provides the invention laminate with significant flexibility.

Viscosity reducing polymers and plasticizers can also be blended with the elastomers such as low molecular weight polyethylene and polypropylene polymers and copolymers, or tackifying resins such as Wingtack™, aliphatic hydrocarbon tackifiers available from Goodyear Chemical Company. Tackifiers can also be used to increase the adhesiveness of an elastomeric layer to a skin layer. Examples of tackifiers include aliphatic or aromatic hydrocarbon liquid tackifiers, polyterpene resin tackifiers, and hydrogenated tackifying resins. Aliphatic hydrocarbon resins are preferred.

Additives such as dyes, pigments, antioxidants, antistatic agents, bonding aids, antiblocking agents, slip agents, heat stabilizers, photostabilizers, foaming agents, glass bubbles, starch and metal salts for degradability or microfibers can also be used in the elastomeric core layer(s). Suitable antistatic aids include ethoxyiated amines or quaternary amines such as those described, for example, in U.S. Pat. No. 4,386,125 (Shiraki), who also describes suitable antiblocking agents, slip agents and lubricants. Softening agents, tackifiers or lubricants are described, for example, in U.S. Pat. No. 4,813,947 (Korpman) and include coumarone-indene resins, terpene resins, hydrocarbon resins and the like. These agents can also function as viscosity reducing aids. Conventional heat stabilizers include organic phosphates, trihydroxy butyrophenone or zinc salts of alkyl dithiocarbonate. Suitable antioxidants include hindered phenolic compounds and amines possibly with thiodipropionic acid or aromatic phosphates or tertiary butyl cresol, see also U.S. Pat. No. 4,476,180 (Wnuk) for suitable additives and percentages.

Short fibers or microfibers can be used to reinforce the elastomeric layer for certain applications. These fibers are well known and include polymeric fibers, mineral wool, glass fibers, carbon fibers, silicate fibers and the like. Further, certain particles can be used, including carbon and pigments.

Glass bubbles or foaming agents are used to lower the density of the elastomeric layer and can be used to reduce cost by decreasing the elastomer content required. These agents can also be used to increase the bulk of the elastomer. Suitable glass bubbles are described in U.S. Pat. Nos. 4,767,726 and 3,365,315. Foaming agents used to generate bubbles in the elastomer include azodicarbonamides. Fillers can also be used to some extent to reduce costs. Fillers, which can also function as entiblocking agents, include titanium dioxide and calcium carbonate.

The skin layer can be formed of any semi-crystalline or amorphous polymer that is less elastic than the core layer(s) and will undergo permanent deformation at the stretch percentage that the elastomeric laminate will undergo. Therefore, slightly elastic compounds, such as some olefinic elastomers, e.g. ethylene-propylene elastomers or ethylene-propylene-diene terpolymer elastomers or ethylenic copolymers, e.g., ethylene vinyl acetate, can be used as skin layers, either alone or in blends. However, the skin layer is generally a polyolefin such as polyethylene, polypropylene, polybutylene or a polyethylene-polypropylene copolymer, but may also be wholly or partly polyamide such as nylon, polyester such as polyethylene terephthalate, polyvinylidene fluoride, polyacrylate such as poly(methyl methacrylate)(only in blends) and the like, and blends thereof. The skin layer material can be influenced by the type of elastomer selected. If the elastomeric layer is in direct contact with the skin layer the skin layer should have sufficient adhesion to the elastomeric core layer such that it will not readily delaminate. Acceptable skin-to-core contact has been found to follow three modes; first, full contact between core and microtextured skin; second, cohesive failure of the core under the microstructure folds; and third, adhesive failure of the skin to the core under the microstructure folds with intermittent skin/core contact at the fold valleys. However, where a high modulus elastomeric layer is used with a softer polymer skin layer attachment may be acceptable yet a microtextured surface may not form.

The skin layer is used in conjunction with an elastomeric layer and can either be an outer layer or an inner layer (e.g., sandwiched between two elastomeric layers). Used as either an outer or inner layer, the skin layer will modify the elastic properties of the elastomeric laminate.

Additives useful in the skin layer include, but are not limited to, mineral oil extenders, antistatic agents, pigments, dyes, antiblocking agents, provided in amounts less than about 15%, starch and metal salts for degradability and stabilizers such as those described for the elastomeric core layer.

Other layers may be added between the core layer and the outer layers, such as tie layers to improve the bonding of the layers. Tie layers can be formed of, or compounded with, typical compounds for this use including maleic anhydride modified elastomers, ethyl vinyl acetates and olefins, polyacrylic imides, butyl acrylates, peroxides such as peroxypolymers, e.g., peroxyolefins, silanes, e.g., epoxysilanes, reactive polystyrenes, chlorinated polyethylene, acrylic acid modified polyolefins and ethyl vinyl acetates with acetate and anhydride functional groups and the like, which can also be used in blends or as compatiblizers in one or more of the skin or core layers. Tie layers are particularly useful when the bonding force between the skin and core is low. This is often the case with polyethylene skin as its low surface tension resists adhesion. However, any added layers must not significantly affect the microstructuring of the skin layers.

One unique feature of the invention is the ability to control the shrink recovery mechanism of the laminate depending on the conditions of film formation, the nature of the elastomeric layer(s), the nature of the skin layer(s), the manner in which the laminate film is stretched and the relative thicknesses of the elastomeric and skin layer(s). By controlling these variables in accordance with the teaching of this invention, the laminate film can be designed to instantaneously recover, recover over time or recover upon heat activation.

A laminate capable of instantaneous shrink is Qne in which, the stretched portion of the elastomeric laminate will recover more than 15% in 1 sec. A laminate capable of time shrink is one Where the 15% recovery point takes place more than 1 sec., preferably more than 5 sec., most preferably more than 20 sec. after stretch, and a laminate capable of heat shrink is where less than 15% shrink recovery occurs to the laminate in the first 20 seconds after stretch. Percent recovery is the percent that the amount of shrinkage is of the stretched length minus the original length of the activated area. For heat shrink there will be an activation temperature which will initiate significant heat activated recovery. The activation temperature used for heat shrink will generally be the temperature that will yield 50% of the total possible recovery ($T_{a-50}$) and preferably this temperature is defined as the temperature which will yield 90% ($Ta_{a-90}$) of the total possible recovery. Total possible recovery includes the amount of preactivation shrinkage.

Generally, where the skin layer of the laminate in the preferential activation region is relatively thin, the laminate will tend to contract or recover immediately. When the skin thickness is increased sufficiently the laminate can become heat shrinkable in the activated regions. This phenomenon can occur even when the elastomeric layer is formed from a non-heat shrinkable material. By careful selection of the thicknesses of the elastomeric layer and the skin layer(s), the temperature at which the laminate recovers by a set amount can be controlled within a set range. This is termed skin controlled recovery, where generally by altering the thickness or composition of the skin, one can raise the elastic recovery activation temperature of an elastomeric core by a significant degree, generally more than at least 10° F. (5.6° C.) and preferably by 15° F. (8.3° C.) and more. Although any skin thickness which is effective can be employed, too thick a skin will cause the laminate to remain permanently set when stretched. Generally, where a single skin as less than 30% of the laminate this will not occur. For most heat or time shrink materials, the stretched activated regions of the elastomeric laminate must be cooled so that the energy released during stretching does not cause immediate heat activated elastic recovery. Fine tuning of the shrink recovery mechanism can be accomplished by the degree that the activated regions are stretched. However, where it is desired to significantly stretch the preferentially activated regions, the adjacent nonpreferentially activated regions must have a Youngs Modulus greater than the instantaneous modulus of the activated region at the degree of desired stretch.

This overall control over the shrink recovery mechanism of the activated regions of the elastomeric laminate discussed above coupled with the ability to control the amount of stretch needed to activate regions of the laminate are extremely important advantages. This control permits adjustment of the activation and recovery mechanism of the elastomeric laminate to fit the requirements of a manufacturing process, thereby avoiding the need to adjust a manufacturing process to fit the shrink recovery mechanism of an elastomer.

One is also able to use skin controlled recovery to control the slow or time shrink recovery mechanism, as with the heat shrink mechanism. This shrink recovery mechanism occurs as an intermediate between instant and heat shrink recovery. Skin layer and stretch ratio control is possible as in the heat shrink mechanism, with the added ability to change the shrink mechanism in either direction, i.e., toward a heat or an instant shrink elastomeric laminate.

A time shrink recovery laminate will also exhibit some heat shrink characteristics and vice versa. For example, a time shrink laminate can be prematurely recovered by exposure to heat, e.g., at a time prior to 20 seconds after stretch.

Recovery can also be initiated for most time shrink and some low activation temperature heat shrink recovery laminates by mechanical deformation or activation. In this case, the laminate is scored, folded, wrinkled, or the like to cause localized stress fractures that cause localized premature folding of the skin, accelerating formation of the recovered microtextured laminate. Mechanical activation can be performed by any suitable method such as by using a textured roll, a scoring wheel, mechanical deformation or the like.

Figure 11:
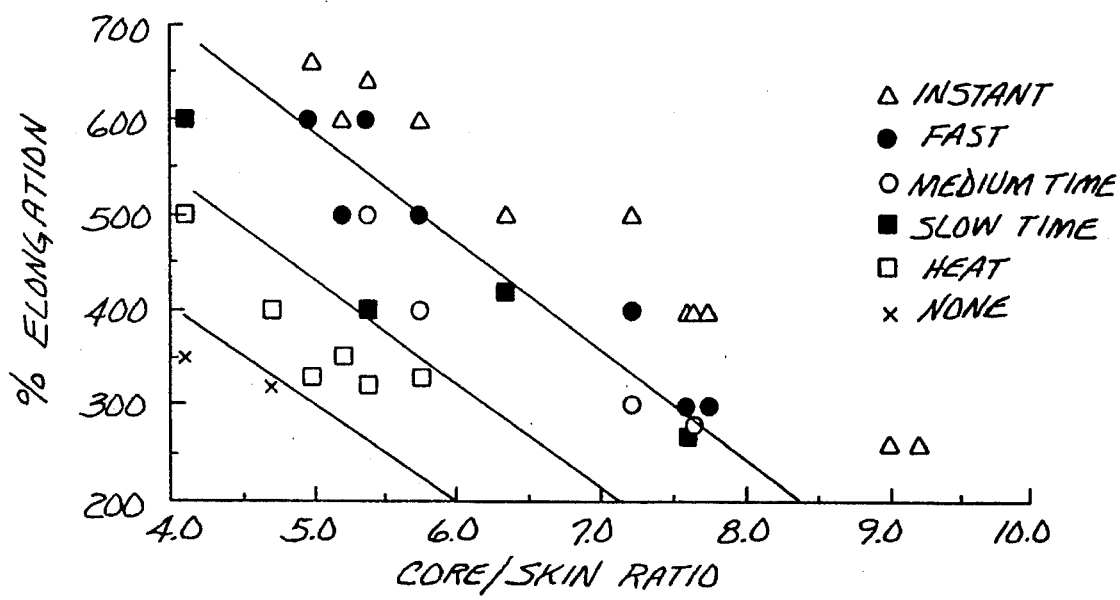
FIG. 11 is a diagram showing the relationship between the shrink mechanism and the core/skin ratio and stretch ratio for a second uniaxially stretched film.

FIG. 11 shows a shrink mechanism diagram for polypropylene/styrene-isoprene-styrene (SIS)/polypropylene(PP) laminates prepared in accordance with Example 27. This diagram demonstrates the ability to control the shrink recovery mechanism by the skin/core ratio and the stretch ratio.

Although FIG. 11 is illustrative of a particular set of starting materials and thicknesses it does represent the general relationship between the layer ratios and stretch ratio to the shrink mechanism of the laminate. Other variables will affect the above relationship such as overall laminate thickness, the presence of tie layers and the thickness and type of any adhesive layer. However, the general relationship between the core/skin ratio and the stretch ratio to the relaxation method will still be present.

Additives to the core layer discussed above can significantly affect the shrink recovery mechanism. For example, stiffening aids such as polystyrene can shift an otherwise heat shrinkable laminate into a time or instant shrink laminate. However, the addition of polypropylene or linear low density polyethylene (less than 15%) to a styrene/isoprene/ styrene block copolymer core resulted in exactly the opposite effect, namely transforming time or instant shrink laminates to heat shrink or no shrink laminates. However, the possibility of polyolefin use in the elastomeric core layer is significant from a processing standpoint in permitting limited recycling of off batches while polyolefin additives can lower extruder torque. These additives are also useful in providing the invention low modulus regions when they are selectively included in either these regions, or the adjoining high modulus regions, depending on the modulus effect of the additive.

A further unique feature of the present invention lies in the ability to significantly reduce the coefficient of friction (C.O.F.) of the activated regions of the elastomeric laminate.

The microtexturing is the major factor contributing to this C.O.F. reduction which, as discussed above, is controllable not only by the manner in which the laminate is stretched but also by the degree of stretch, the overall laminate thickness, the laminate layer composition and the core to skin ratio. Fine texture yields lower C.O.F. values. Preferably, the C.O.F. will be reduced by a factor of 0.5 and most preferably by at least a factor of 0.1 of the microtextured laminate to itself in the direction of stretch, when a microstructured surface is formed in accordance with the invention, as compared to the as cast laminate. This ability to reduce C.O.F. is extremely advantageous as it contributes to a softer texture and feel for the laminate, which is desirable for use in the medical and apparel fields.

Figure 6:
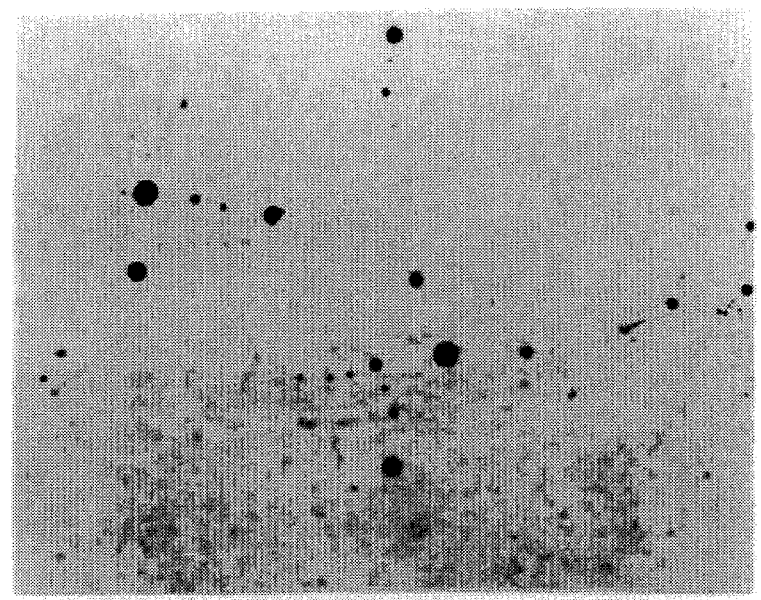
FIG. 6 is a photograph of a unstretched laminate that has been marked with ink.
Figure 7:
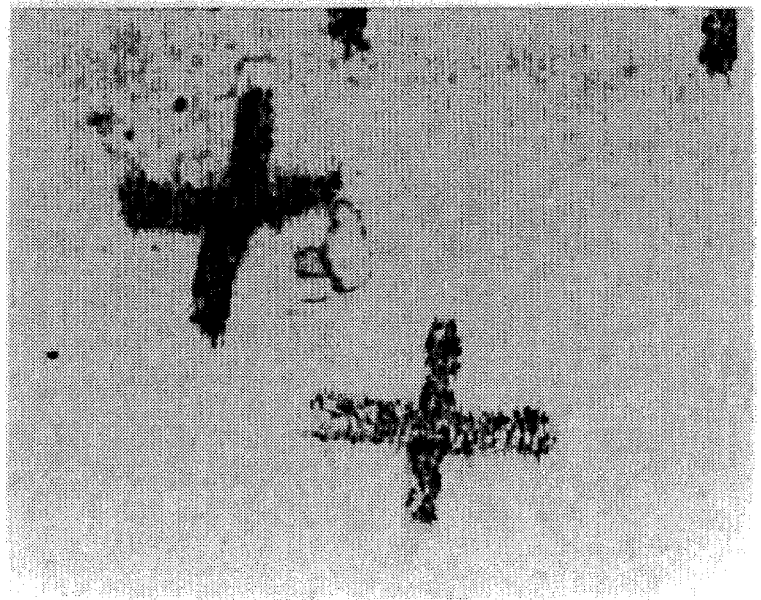
FIG. 7 is a photograph of the stretched laminate of FIG. 6 marked with the same ink.

Writability of the laminate in the activated regions is also increased by the microstructured surface that results when the stretched laminate recovers. Either organic solvent or water-based inks will tend to flow into the microstructured surface channels and dry there. FIG. 6 shows the surface of an unstretched, untextured laminate where the ink clearly beads up. FIG. 7 demonstrates the improvement in writability for the laminate of FIG. 6 after stretching and recovery to create a microtextured surface (see example 24). The more viscous the ink the less it will tend to wick in the microchannels of the surface and hence bleed. Similarly, the more the surface attraction between the skin layer and the ink, the better will be the writing characteristics of the microstructured surface. The writing surface characteristics of the film can also be altered with conventional additive or surface treatment techniques to the extent that they do not interfere with microtexturing.

The improvements in the laminate structure of this invention over that of copending application Ser. No. 07/438,593 lie in the control of the elastic modulus or stress at selected regions or zones of the laminate cross-section. First, the zones or regions controlled to have lower overall modulus values will preferentially yield before adjacent, in the direction of an orienting stress, higher modulus regions. This modulus control can be accomplished by a variety of methods that can involve the prelaminate formation stages, the formation stage, or post formation treatment of a particular laminate or laminate intermediate.

Similarly, localization of stress, applied to the whole laminate, can result in preferential elongation in areas containing these localized stress regions. This stress control can also be effected by a variety of methods in any of a multitude of stages in the formation of the laminate.

Post laminate-formation modulus or stress treatment has the advantage of permitting modification of laminates without having to modify the apparatus that produces the basic material. The same line can produce laminates having relatively constant modulus values over its cross-section, or laminates for later treatment to yield regions of modified modulus or stress values. This post laminate formation modulus treatment can include post formation annealing, selective crosslinking or selective plasticization. Post formation stress localization can be effected by localized corona treatment, mechanical ablation, scoring, cutting out laminate material, indentation, controlled localized stretching or like treatments.

In corona treatment, the treatment is allowed to progress to the point of saturation by variation of the power density and/or time of exposure. At the point of saturation, the degree of oxidation of the surface does not further increase, and further treatment results in ablation of the surface. Corona treatment can be selectively applied by use of masks.

The point of saturation can be reached more readily by raising the temperature of the laminate to be treated. The temperature of the laminate can be raised even above the glass transition point of one or more layers, as any annealing effects will be non-preferential. This has advantages in the final product as annealing relieves localized stresses at the layer interfaces. This improves product stability, as stress can accelerate degradation of some elastomers as well as delamination.

Lower power corona treatment without ablation is also possible. In this case, the laminate would be treated below the saturatioh point. The preferential stress regions would be formed by changing the takeoff angle from, e.g., the corona treatment take-up roll or surface. A sharp takeup angle will create microcracks in the material surface where it has been corona treated. Generally, an angle of 110° or greater from normal is sufficient. This will create an area of preferential stress. Preferably, this would be accomplished by corona treating longitudinal zones (in the machine direction), which when subjected to a sharp takeup angle would create alternating zones with and without microcracks.

Annealing can be performed at any suitable temperature and for any suitable duration, depending on the material to be modified. Generally, this temperature is above the glass transition temperature of the skin layer material. If heated above the melt temperature of the skin layer, it can be cooled at a rate that will either induce more or less crystallization than than the adjacent regions to create either preferential or nonpreferential activation regions. Specific preferred annealing temperatures will depend upon the amount of crystallinity already present in the material and the material itself. To work the modulus or stress modification, treatment method should be capable of forming a laminate which under, e.g., elongational stress will exhibit a double yield point, such as that shown in FIG. 14(A). In this figure, the first yield point DD corresponds to the initiation of elongational orientation in the low modulus region(s) or zone(s), whereas the second yield point EE corresponds to the start of elongational orientation in the higher modulus region(s) or zones. This double yield point is essential for good regionalized, modulus controlled, elastic activation of the laminate. The greater the separation between the two yield points, the more accurate will be the ability to control regionalized orientation and elastic activation. Greater yield point separation also permits higher elongation ratios in the lower modulus region(s) prior to the initiation of secondary stretching in the higher modulus region. This double yield point is not as essential when a patterned array of low modulus or stress areas are used to create a complex composite surface structure. In this case, a great, if not infinite, number of yield points may be present as modulus values may fluctuate greatly transverse to the direction of stretch.

With post formation annealing, the different modulus regions are obtained by taking advantage of the different crystallization states of particular polymers, which can be activated by a temperature controlled annealing. Generally, one is capable of annealing semicrystalline polymers to yield regions having significantly different modulus values, and if the regions are properly oriented to the elongation direction, a double yield point. Annealing can result in a change in the degree of crystallization, the size and arrangement of crystallites, structural morphology, and/or the number of tie chains between crystallites, which changes have an effect on the elastic modulus of the polymer. With post formation annealing the temperature of effective annealing is generally significantly above the glass transition temperature. Material that has been extruded and cast onto a chill roll will generally have a certain degree of crystallinity, depending on the chill roll temperature, orientation, drawdown, extrusion temperature and the like. In order to induce additional annealing, the temperature will generally be at least 5° C. above $T_g$ and at least 50° C. above $T_g$ for certain polymers such as polypropylene. Higher annealing temperatures will generally be preferred as this will keep the time of annealing down and will generally promote more significant changes in crystallinity.

Annealing or crystallization can also be performed during the formation of the laminate. For example, where extrusion onto a casting wheel is used to form the laminate, the casting wheel can have zones at different temperatures to form a laminate with multiple crystalline states. Analogous annealing steps could be used in other extrusion or laminate forming processes.

Annealing can also be performed on specified layers. For example, the temperature and time of contact with an annealing roll, or the like, can be controlled to limit the annealing to specified layers. Also annealing can be performed to a specified layer, or layers, which are then joined to other layers, such as in a sequential extrusion or lamination process.

Polymers suitable for use in forming the respective skin and/or core layers of the invention elastomeric laminate are generally suitable for annealing treatment as above described, including polyolefins such as polypropylene or polybutylene, nylon, semicrystalline polyesters such as polyethyleneterephthalate, polybutyleneterephthalate or polyethylenenaphthalate or polyvinyl idene fluoride.

Figure 13:
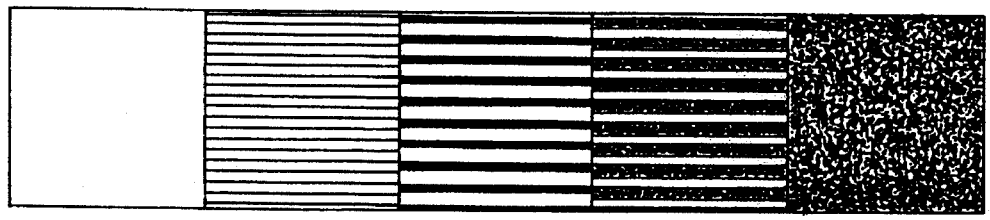
FIG. 13 is a schematic representation of a series of laminates annealed 0, 25%, 50%, 75% and 100%, respectively.
Figure 14A:
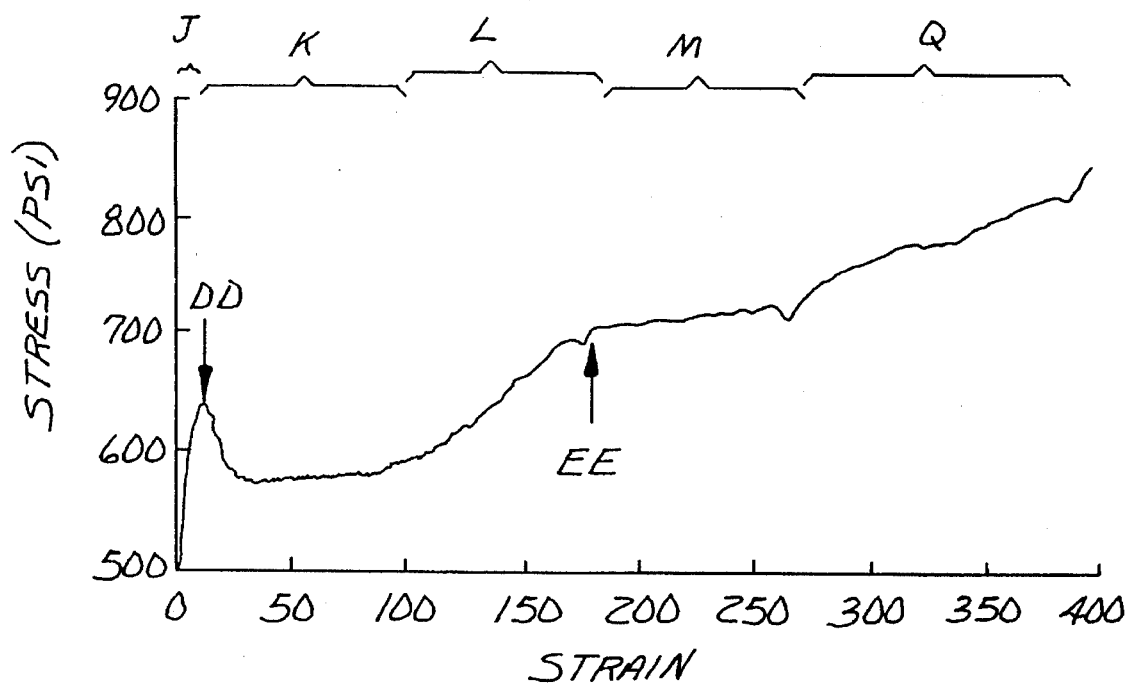
FIGS. 14 (A)–(C) are a series of stress-strain curves for the samples schematically shown in FIG. 13 for 25%, 50% and 75% annealing, respectively.
Figure 14B:
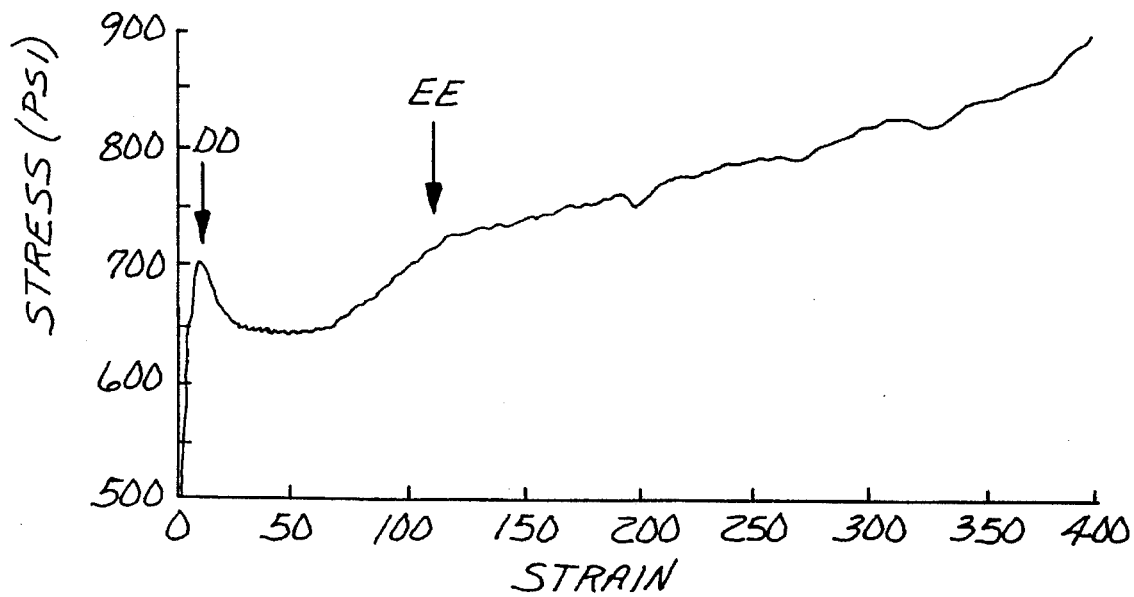
Figure 14C:
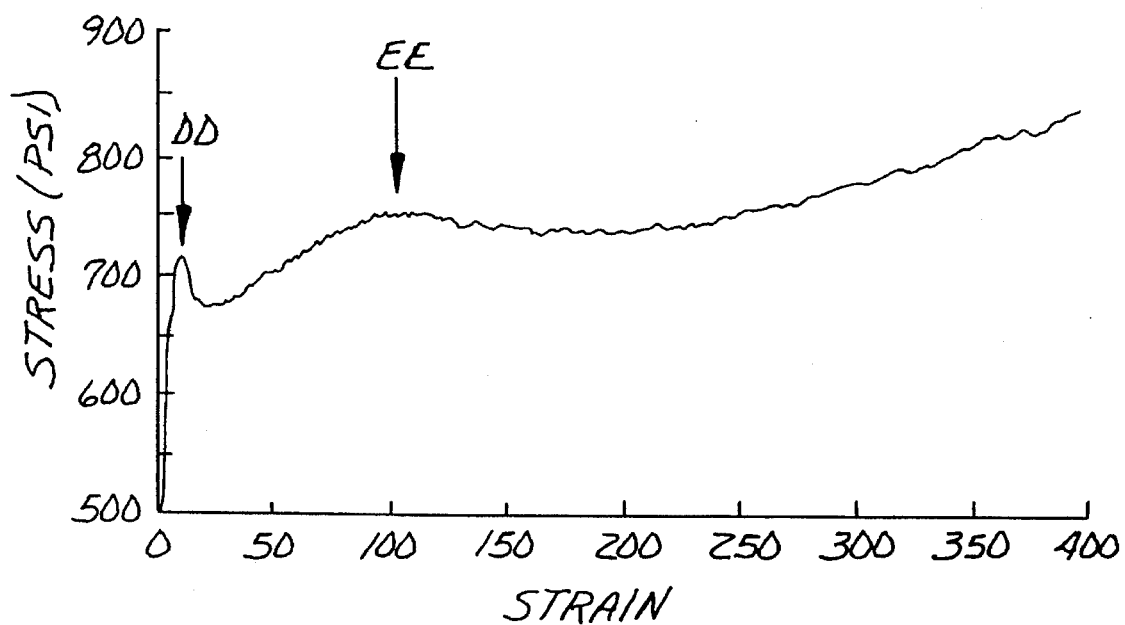

FIG. 13 shows a series of annealed structures formed in accordance with the invention having varying percentages of annealed surface. FIGS. 14(A)–(C) are tensile strength versus strain plots for the annealed structures shown in FIG. 13(the darker shaded areas indicate the annealed areas). In FIG. 14(A), there are five distinct zones of elastic behavior of the laminate as it is stretched transverse to the annealed stripes. Zone J corresponds to elastic deformation in the non-annealed regions. zone K corresponds to the initiation of plastic deformation in the non-annealed regions. Zone L corresponds to continued orientation in the non-annealed regions and elastic deformation in the annealed regions. zone M corresponds to the initiation of plastic deformation in the annealed region, and Zone Q corresponds to orientation of the entire laminate. Points DD and EE, as discussed above, are transitional points between elastic and plastic deformation for the non-annealed and annealed regions, respectively. Similar plots, Figs. 14(B) and (C), were made for the 50% and 75% annealed structures of FIG. 13, where DD and EE designate identical transition points. These points are not that distinct, it is believed, due to heat migration from the annealed to non-annealed regions resulting in slight transitional, slightly annealed zones. These transition zones reduce the sharpness of the plotted transition points.

The formed laminate, or an intermediate layer(ed) structure, can also be treated with suitable plasticizing agents to selectively soften certain regions of specified skin or core layers. This will generally lower the modulus in those regions treated, which again will allow for the generation of a double yield point laminate. Generally, any plasticizer that will soften a specified layer will be minimally functional at some level. Plasticizers suitable for specified polymers are generally well known and are contemplated for use in the present invention. The plasticizer can be applied to specified regions by any suitable coating technique including rotogravure, extrusion coating, spray coating, Meyer bar coating or any other conventional method. The plasticizer, however, should not significantly migrate from the coating area or zone resolution will be lost.

The formed laminate, or an intermediate layer or layers, can also be subjected to suitable crosslinking treatment to allow for the stiffening of selected regions of a laminate. Crosslinking can be initiated by any suitable method such as chemical, heat or radiation. Photoinitiators include benzoin ethers, benzyl dialkyl ketals such as 2,2-dimethoxy-2-phenylacetophenone, benzophenones and acetophenone derivatives such as 2,2-diethoxyacetophenone, for example. Generally, curing agents need to be introduced into the layer(s) to be crosslinked, either before or during the crosslinking. For example, for radiation crosslinking the crosslinking agent can be introduced into the layer prior to, e.g., extrusion, then subjecting that layer to selective radiation curing, e.g., by selectively irradiating certain specified areas of the laminate with the proper type and amount of radiation. This irradiation process can likewise be performed during laminate formation as discussed above with regard to plasticization. Crosslinking agents can also be introduced after the layer is formed, e.g., by topical application (e.g., with solvent carriers) or in selective regions of the laminate by any suitable method (e.g., the strip coextrusion method discussed herein).

The formed film can also be modified by on-line regionalized heating, followed immediately by stretch activation before the laminate has cooled. In this case the laminate will yield first at the heated areas, where the high temperature has softened and hence temporarily decreased the material's elastic modulus. This will be the opposite effect that is generally achieved when annealing occurs, i.e., where the heated regions are allowed to cool. With annealing, the heat releases stresses and induced orientation. This generally allows a more crystalline and stiffer polymer to form. These annealed areas will then preferentially resist yielding when placed under stress.

Figure 3:
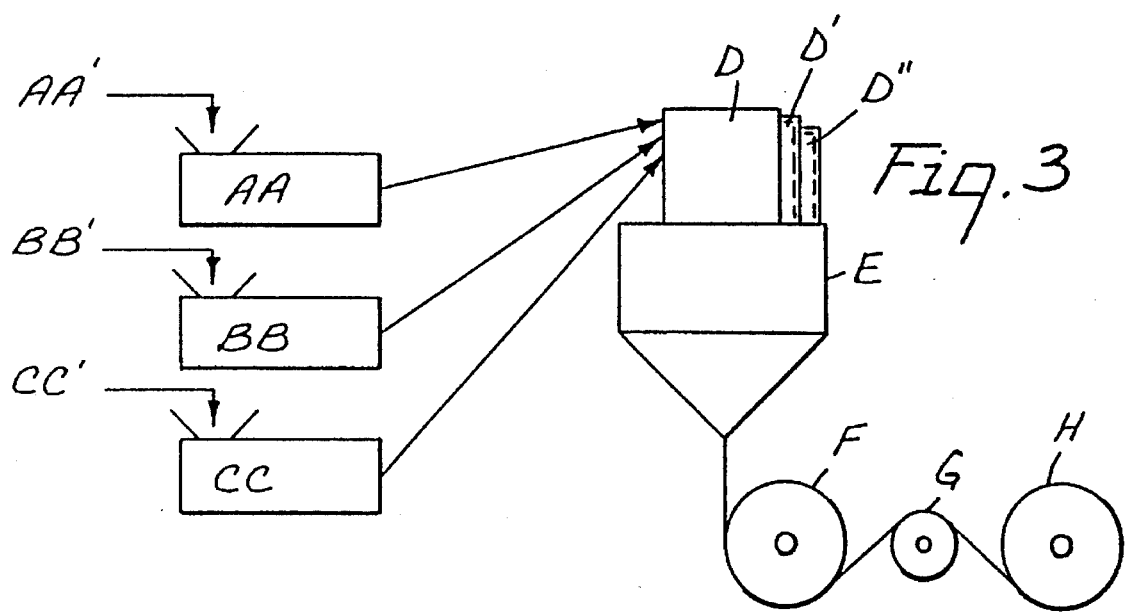
FIG. 3 is a schematic representation of a process and apparatus used to coextrude the laminates of the invention.

The regionalized modulus modifications can also be built into the laminate by strip coextrusion of a layer or layers. By strip coextrusion, it is meant that a single layer can be formed from a plurality of polymer streams extruded to form multiple regions having varying modulus values. Additives can be used to later adjust a region's modulus value (e.g., crosslinking agents). This multiple component or composite layer can then be joined with another layer or layers, which may, or may not, similarly be strip coextruded. A preferred mechanism for strip extrusion is shown in FIG. 3 where D, D' and D" are a multilayer feedblocks or manifolds, such as that disclosed in U.S. Pat. No. 3,557,265 (Chisholm). This multilayer feedblock forms the strip extruded layer and may be used with transition pieces to vary the height and width of the strip extruded layer or film. E is a conventional multiple layer die or a combining adapter and die such as disclosed in U.S. Pat. Nos. 4,152,387 or 4,197,069 (Cloeren). As shown, multilayer feedblocks or manifolds can be used to feed into each layer passageway of the multiple layer die E or to only a single passageway of such a die. Depending on the manifold D arrangement, there can be two or more strips, of different composition, in each layer. Generally, two alternating strips are fed by the multilayer feedblock. However, more than two strips can be formed by using a feedblock such as that disclosed in Weisnet et al., U.S. Pat. No. 4,435,141 (three alternating strips). AA, BB, and CC are extruders. AA', BB' and CC' are streams of thermoplastic material flowing into the feedblock or manifold die. E is the 3 or more (e.g., 5-layer) layer feedblock and die, F is a heated casting roll, and G and H are rolls to facilitate take-off and roll-up of the laminate.

The die and feedblock used are typically heated to facilitate polymer flow and layer adhesion. The temperature of the die depends upon the polymers employed and the subsequent treatment steps, if any. Generally the temperature of the die is not critical but temperatures are generally in the range of 350° to 550° F. (176.7° to 287.8° C.) with the polymers exemplified.

Using the Weisner et al. arrangement, it is possible to obtain a laminate layer having up to three separate modulus regions. For a multilayered laminate, each layer can similarly be formed of strips of materials with different potential modulus values, which is shown for a three layer laminate in FIG. 1.

In FIG. 1, numbers 10–18 each represent a separate strip which may or may not be the same and may or may not be overlapping. For a three layer embodiment outer layers 2 and 3, with strips 10–12 and 16–18, are preferably skin layers. Each of the strips may be formed of any potential skin material which are selected to provide for distinct modulus values in selected regions of the overall laminate. Alternatively, additives can be added to adjust the modulus of a polymer fed as one strip in the feed manifold, which polymer may or may not be the same as the polymer of adjacent strips. This would include additives such as stiffening aids, e.g., polystyrene; softening aids, e.g, plasticizers; fillers; or post fabrication modifiers such as crosslinking agents. These additives can be used to modify selected strips of a skin or core layer while allowing the polymer matrix of the layer as a whole to remain the same. This approach helps minimize possible strip separation or a need for compatabilizers, as compared to where the materials fed to adjacent strips are incompatible polymers.

Coke layers(strips 13–15) can be formed of strips of elastic material having different modulus values to yield a laminate with regions of varying modulus values. Alternatively, the core can be formed of alternating strips of elastic material and higher modulus inelastic material. This is preferred in terms of cost. However, the strips may separate when stretched if the elastic and inelastic materials are significantly incompatible.

Concentration of stress at localized regions within a laminate can be accomplished in any of a number of ways as previously outlined. The regions which have been treated to concentrate stress will act as initiation points for strain elongation. For example, a stressed laminate will preferentially yield at the point where scored. In order to create preferential elongation over a entire area of the laminate, preferentially the area will contain regions with numerous score lines. Generally, the higher the concentration of score lines in an area or region the more precise will be the preferential elongation in that area or region. Similarly, with other methods such as ablation or corona discharge, the more concentrated and defined the treatment the more accurate will be the preferential elongation.

The overall laminate or prelaminate structure of the present invention may be formed by any convenient layer forming process such as by pressing layers together, coextruding the layers or stepwise extrusion of layers, but coextrusion is the presently preferred process for forming a laminate with most modulus modification treatment methods contemplated. However, modulus modification treatment methods which directly treat middle laminate layers cannot be used with a direct coextrusion method. Coextrusion per se is known and is described, for example, in U.S. Pat. Nos. 3,557,265 to Chisholm et al. and 3,479,425 to Leferre et al. Tubular coextrusion or double bubble extrusion is also possible. The layers are typically coextruded through a specialized die and/or feedblock that will bring the diverse materials into contact while forming the laminate.

Whether the laminate is prepared by coating, lamination, sequential extrusion, coextrusion or a combination thereof, the laminate formed and its layers will preferably have substantially uniform thicknesses across the laminate. Laminates prepared in this manner have generally uniform properties with a minimum of edge effects such as curl, modulus change, fraying and the like.

The laminate of the invention has an unlimited range of potential widths, the width limited solely by the fabricating machinery width limitations. This allows fabrication of zone activatable microtextured elastomeric laminates for a wide variety of potential uses.

After forming the zone activatable laminate, the laminate is stretched past the elastic limit of the skin layer(s) exclusively or preferably in the lower modulus or preferred stress regions, which deform. The zone activated laminate then is recovered instantaneously, with time or by the application of heat, as discussed above. For heat activated recovery the inherent temperature of heat activation is determined by the materials used to form the elastic layer of the laminate in the first instance. However, for any particular laminate the activation temperature, for example, either $T_{a-50}$ or $T_{a-90}$, can be adjusted by varying the skin/core ratio of the laminate, adjusting the percent stretch or the overall laminate thickness. The activation temperature used for a heat shrink laminate is generally at least 80° F. (26.7° C.), preferably at least 90° F. (32.2° C.) and most preferably over 100° F. (37.8° C.). When heat activated the stretched laminates are quenched on a cooling roller, which prevents the heat. generated during elongation from prematurely activating laminate recovery in the activated regions. The chill roll temperature is maintained below the activation temperature.

Figure 2:
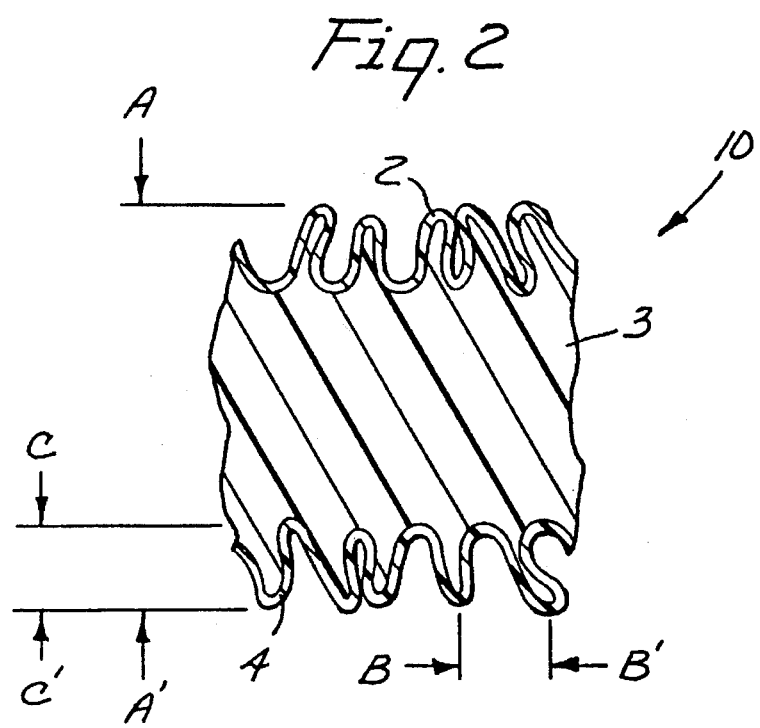
FIG. 2 is the cross-sectional segment of FIG. 1 of the laminate with microstructuring caused by uniaxially stretching a film of the invention.

FIG. 2 iS a schematic diagram of the common dimensions which are variable for uniaxially stretched and recovered laminates in the activated regions. The general texture is a series of regular repeating folds. These variables are the total height A—A' the peak to peak distance B—B' and the peak to valley distance C—C'. These variables were measured for a series of polyolefin/styrene-isoprene-styrene/polyolefin laminates. General ranges for A—A', B—B' and C—C' were noted. For total height (A—A') the range measured was from 0.79 to 32 mils(0.02 to 0.81 mm). For peak to peak distance (B—B'), or the fold period, the measured range was from 0.79 to 11.8 mils(0.02 to 0.30 mm). For peak to valley distance (C—C') the measured range was from 0.04 to 19.7 mils(0.001 to 0.5 mm). These ranges are only exemplary of the surface characteristics obtainable by the practice of the present invention. Laminates of other compositions will demonstrate different microstructures and microstructure dimensions. It is also possible to obtain dimensions outside the above ranges by suitable selection of core/skin ratios, thicknesses, stretch ratios and layer compositions.

Activation will generally be accomplished by stretching the laminate in a direction substantially transverse to a primary extent of the film having at least displaced zones or regions of differing modulus or stress characteristics. These zones can be comprised of a single uniform, e.g., modulus region or multiple regions of differing modulus values yielding an overall zone composite modulus value. This composite value will depend upon the arrangement and placement of the low and high modulus regions of which it is comprised. For a given film, the high modulus regions can comprise a continuous matrix (in the direction of stretch), in which are found low modulus regions, or be dispersed distinct regions in a low modulus matrix. Where the high modulus laminate regions comprise a continuous matrix, the film when stretched will exhibit constant strain across the extent(s) transverse to the elongation direction as per $$\sigma_{hi}=\sigma_{Li} \quad (1)$$

where $\sigma_{hi}$ is the instantaneous strain in the high modulus regions along this extent and $\sigma_{Li}$ is the instantaneous low modulus region strain. Further the instantaneous total Young's Modulus ($e_{Ti}$) can generally be described as following equation (2).

$$e_{Ti}=e_h f_h+e_L f_L \quad (2)$$

where $$f_h+f_L=1, \quad (3)$$

and $$\pi_T=\pi_h f_h+\pi_L f_L \quad (4)$$

f is the volume fraction of a particular modulus region, $\pi$ designates the stress and e is the composite modulus for the extent. The extent(s) with the lowest modulus value(s) will preferentially yield first, until its stress value overcomes the yield point of the extent(s) with the next highest modulus and so on.

Where the laminate has a continuous low modulus region in the direction of stress, the elongation will propagate preferentially in these low modulus regions. Stress, however, should remain constant as per equation (5).

$$\pi_h=\pi_L=\pi_T \quad (5)$$

while $$\sigma_T=\sigma_h f_h+\sigma_L f_L \quad (6)$$

Equation (2) will still apply. This indicates that stress will remain constant across a given transverse cross-section. However, within that cross-section, as the modulus value will vary with the material ($e_m$) within the cross-section, the strain ($\sigma_m$) felt by the material, forming either high or low modulus zones, intersecting the cross-section will vary inversely with the modulus value of the material ($e_m$) as per equation (7).

$$e_m=\frac{\pi_T}{\sigma_m} \quad (7)$$

The above discussion represents a simplified version of material behavior with varying low and high modulus regions. However, it represents a good approximation of overall or regionalized film behavior. It will also work with preferential stress regions.

Figure 17:
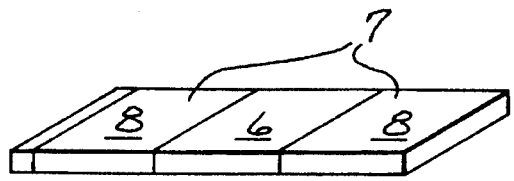
FIG. 17 is a diaper tape tab formed of the invention preferentially activatable laminate.

For a simplified basic embodiment where it is desired only to activate predetermined areas, such as for the diaper tab of FIG. 17, transverse to the stretch direction, the discussion can be simplified. It is assumed that the non-preferentially activated areas are predominately, if not entirely, high-modulus material or non-preferential stress material (as per FIG. 1). In the area to be preferentially activated, an extent transverse to stretch will preferably intersect lower modulus, or preferential stress, material regions over at least 20% and more preferably over at least 50% of its length. This will cause the laminate to preferentially activate in at least one area or zone. Generally, in the non-preferentially activated areas or zone, the extents will intersect low modulus or preferential stress material regions by at least 20% less, on average, than the corresponding extents in the preferentially activated areas or zone(s), and more preferably will be at least 50% less. To ensure preferential activation, the extents in the non-preferentially activated zones will most preferably be free of low modulus or preferential stress material regions over their length. Likewise, preferably, a lower modulus material region will extend continuously across the full extent of the preferentially activated areas or zones of the film. Although not preferred for both manufacturing and practical reasons, multiple low modulus material regions could define a single preferentially activated zone as defined above.

Because of the desire to preferentially elasticize specific material regionS, areas or zones of a film, multiaxial stretching is not as desirable as it is where the entire laminate is elasticized. Multiaxial stretching has the tendency to activate the entire laminate, at least where one continuous elastomeric layer is used. However, multiaxial stretching is possible as long as at least the primary stretch direction is capable of preferentially activating areas or zones containing a low modulus or preferential stress material region(s) and the laminate is stretched to a degree sufficient to preferentially activate these zones. The remaining direction(s) of stretch, in most cases, will be orthogonal to the primary direction, which generally will be a direction not capable of preferentially activating the low modulus or preferential stress region containing zones. The degree of stretch in these secondary directions must be less than that needed to activate the transverse relatively high modulus or non preferential stress regions, areas or zones if such activation is not desired.

Multiaxial stretching, however, may be desirable where a complex microstructure is desired. Biaxially stretching creates unique surfaces while creating a laminate which will stretch in a multitude of directions and retain its soft feel.

It has also been found that the fold period of the microstructured surface is dependent on the core/skin ratio. The periodicity is also indicative of the texture of the surface as per Table I. This is again another indication of the control possible by careful choice of the parameters of the present invention.

Figure 5:
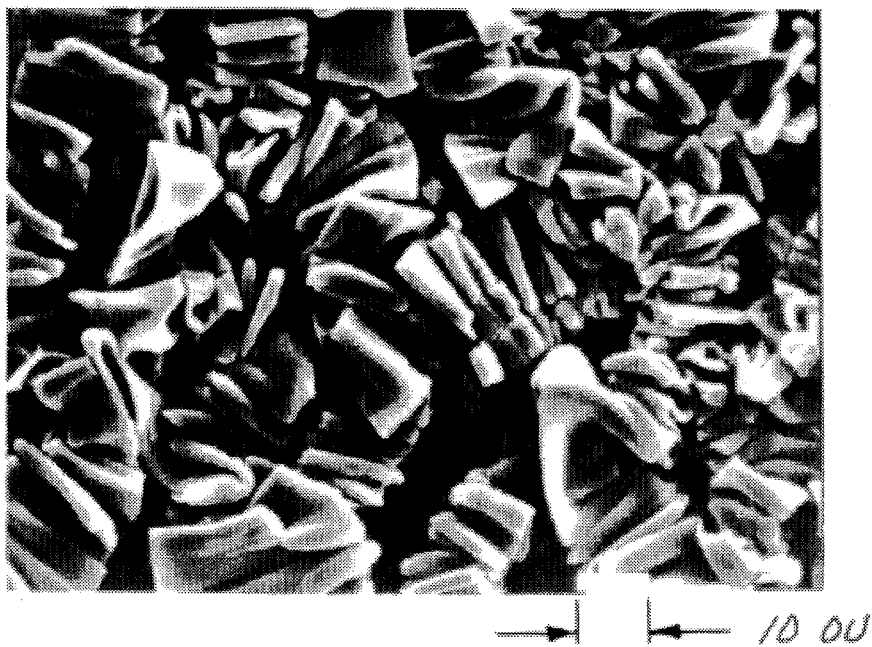
FIG. 5 shows an electron micrograph (1000×) of a laminate sample with a polyethylene skin which was simultaneously biaxially stretched.
Figure 9:
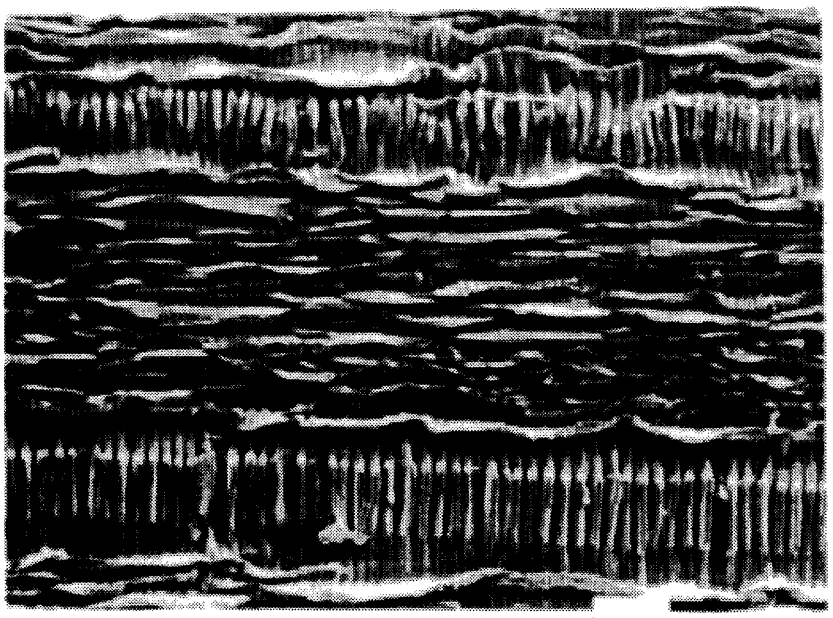
FIG. 9 is a scanning electron micrograph (100×) of the surface of a laminate which has been sequentially biaxially stretched.

When the laminate is stretched first in one direction and then in a cross direction, the folds formed on the first stretch become buckled folds and can appear worm-like in character, with interspersed cross folds as in FIG. 9. FIG. 9 is a laminate of PP/styrene-isoprene-styrene(SIS)/PP with a core/skin ratio of 18 (Example 23). Other textures are also possible to provide various folded or wrinkled Variations of the basic regular fold. When the film is stretched in both directions at the same time the texture appears as folds with length directions that are random, as shown in FIG. 5 (a laminate prepared as per Example 19A with skin/core/skin thicknesses of 5/115/5 microns respectively) or FIG. 10 (Example 23). Using any of the above methods of stretching, the surface structure is also dependent, as stated before, upon the materials used, the thickness of the layers, the ratio of the layer thicknesses and the stretch ratio. For example, the extruded multilayer film can be stretched uniaxially, sequentially biaxially, or simultaneously biaxially, with each method giving a unique surface texture and distinct elastomeric properties.

The unique continuous microstructured surfaces of the invention can be altered and controlled by the proper choice of materials and processing parameters. Differences in the material properties of the layers can change the resulting microtextured skin, but it has been found that by the careful choice of the layer ratios, total laminate film thickness, the number of layers, stretch degree, and stretch direction(s) it is possible to exercise significant control over the microstructure of the laminate surface.

The degree of microtexturing of elastomeric laminates prepared in accordance with the invention can also be described in terms of increase in skin surface area. Where the laminate shows heavy textures the surface area will increase significantly. This is demonstrated for linear low density polyethylene(LLDPE)/SIS/LLDpE laminates in Table VIII, Example 16. In this example, as the stretch ratio increases so does the percent increase in surface area, from the unstretched to the stretched and recovered laminate; from 280 at a stretch ratio of 5, to 30 at a stretch ratio of 12. Generally the microtexturing will increase the surface area by at least 50%, preferably by at least 100% and most preferably by at least 250%. The increase in surface area directly contributes to the overall texture and feel of the laminate surface.

Increased opacity of the skin and hence the laminate also results from the microtexturing. Generally, the microtexturing will increase the opacity value of a clear film to at least 20%, preferably to at least 30%. This increase in opacity is dependent on the texturing of the laminate with coarse textures increasing the opacity less than fine textures. The opacity increase is also reversible to the extent that when restretched, the film will clear again.

It is also possible to have more than one elastomeric core member with suitable skins and/or tie layer(s) therebetween. Such multilayer embodiments can be used to alter the elastomeric and surface characteristics of the laminate.

With certain constructions, the microtextured skin layers may tend to delaminate and/or the underlying elastomer may tend to degrade over time. This tendency may particularly occur with ABA block copolymers. Residual stress created during the stretching and recovery steps of activating the material to its elastomeric form can accelerate this process significantly. For those constructions prone to such degradation or delamination a brief relaxing or annealing following activation may be desirable. The annealing would generally be above the glass transition point temperature ($T_g$) of the elastomer, above the B block $T_g$ for ABA block copolymers, but below the skin polymer melting point. A lower annealing temperature is generally sufficient. The annealing will generally be for longer than 0.1 seconds, depending on the annealing temperature. With commercial ABA block copolymers (e.g., Kraton™ 1107) an annealing or relaxing temperature of about 75° C. is found to be sufficient.

The skin layer-to-core layer contact in the stretched and activated film has been observed to vary depending on the skin and core compositions. With certain preferred constructions, the core and skin remain in full contact with the core material, filling the folds formed in the skin layers as shown in FIG. 2. This construction is extremely durable and not as subject to delamination, particularly when annealed following activation. A variation of this continuous contact construction is also possible where the elastomer fills the skin folds, but is observed to cohesively fail under the folds. It is believed this occurs with thicker and/or more rigid skins that expose the underlying elastic to more concentrated stresses during relaxation. An entirely different skin/core adhesion method is also possible. Namely, the core, in some cases, can completely retract from the skin under the folds, but remain sufficiently attached such that the skin does not delaminate (see Example 34, adhesive failure). This construction is not as desirable as during use it is more easily subject to delamination as well as exposing the elastic core to air which may accelerate degradation of the elastomer.

The laminate formed in accordance with the above description of the invention will find numerous uses due to the highly desirable properties obtainable. For example, the microtexture gives the elastomeric laminate a soft and silky feel. The elastic activated portions of the laminate can further be non-necking( i.e., will not tend to thin down when restretched). This renders the elastomeric laminate particularly well suited for a variety of commercially important uses particularly in the garment area, where elastic webs are used in areas to engage or encircle a body portion alone or as part of a garment. Examples of such garments include disposable diapers, adult incontinence garments, shower caps, surgical gowns, hats and booties, disposable pajamas, athleticiwraps, clean room garments, head bands for caps or visors or the like, ankle bands (e.g., pant cuff protectors), wrist bands, rubber pants, wet suits and the like.

The laminate can be extensively used in disposable diapers, for example as a waistband, located in either the front or side portions of the diaper at waist level, as leg elastic, as an outer cover sheet or in adjustable slip-on diapers, where the elastomeric laminate could be used as, or in, side panels around the hip that have zones of elasticity to create a tight fitting garment. The laminates can be applied as continuous or intermittent lengths by conventional methods. When applied, a particular advantage of the laminate is the ability to use thin elastomers with high stretch ratios while activation of the elastomeric laminate can occur at a controlled stretch ratio, depending on the size of the low modulus regions, their activation stretch ratio and modulus behavior.

Garments often are shirred to give a snug fit. This shirring can be easily obtained by applying the laminate while in an unstable stretched condition and then affecting the shirr by application of heat.

The elastomeric laminate can be adhered to the garment by ultrasonic welding, heat sealing and adhesives by conventional methods. With the invention laminate, adherence would be preferably in the non-activated higher modulus or non-preferential stress regions.

The application of adhesive can also be used to preferentially anneal certain portions of a cast laminate. Hot melt applied adhesives will create soft spots which will harden when cooled. The laminate can then be preferentially activated, e.g., with the low modulus regions being the continuous phase to provide adhesive coated unactivated areas. This will allow the elastic to be attached to a substrate without subjecting the adhesive to excessive shear forces caused by substrate movement.

Adhesive can also be applied to a skin layer face prior to activation. The microtexture formed on this skin in the activated areas or regions can reduce the tack of the adhesive in the activated areas if the adhesive layer is approximately the size of the microtexture formed, generally less than 30 microns. This is advantageous Where the activated elasticized area is preferable not permanently adhered to a substrate such as in the diaper fastening tab depicted in FIG. 17.

The ability to create laminates with multiple texture types gives the invention laminate great versatility. The film can be given a clothlike or bulk feel by using patterns of preferentially and non-preferentially activated regions allowing for general film activation with regions of differing activations (i.e., stretch degree, skin thickness, skin type, etc.). This allows for the construction of an essentially infinite variety of surface textures. Usable in a variety of situations, where a clothlike or like textured surface is desired with the properties of a polymeric and/or elastic film.

The controlled relaxation obtainable by adjusting the layer ratios, stretch ratio and direction, and layer composition makes the elastomeric laminate of the invention well suited to high speed production processes where heat activated recovery can be controlled easily by hot fluids such as hot air, microwaves, UV radiation, gamma rays, friction generated heat and infrared radiation. With microwaves, additives, such as iron whiskers, nickle powder or aluminum flakes, may be needed to ensure softening of the skin to effect skin controlled recovery.

Figure 4:
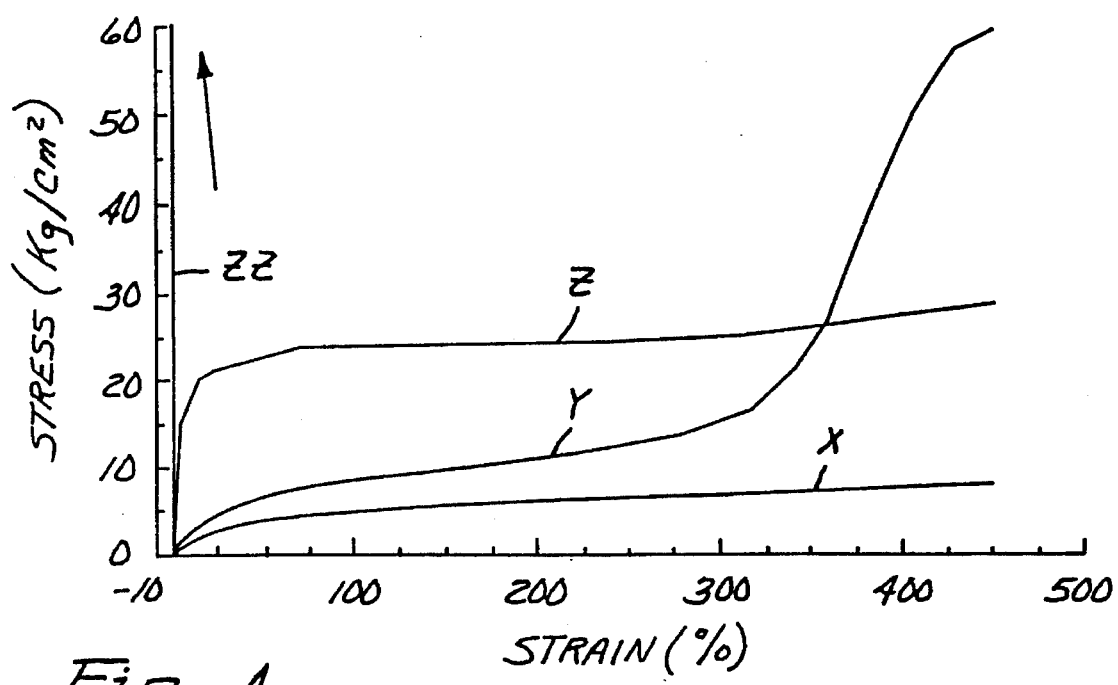
FIG. 4 is a diagram showing the stress-strain characteristics of a laminate and its component layers.

The counter-balancing of the elastic modulus of the elastomeric layer and the deformation resistance of the skin layer also modifies the stress-strain characteristics of the activated areas regions of the laminate. The modulus of the elastic can therefore be modified to provide greater wearer comfort when the laminate is used in a garment. For example, a relatively constant stress-strain curve can be achieved. This relatively constant stress-strain curve can also be designed to exhibit a sharp increase in modulus at a predetermined stretch percent, i.e., the point at which the skin was permanently deformed when activated as shown in FIG. 4, line Y. Prior to activation, the laminate is relatively rigid, line Z of FIG. 4, i.e., having a high modulus imparted due to the skin layer. The non-activated or non-stretched laminate is easier to handle and much better suited to high speed production processes than would be a conventional elastic. To achieve these benefits, the skin can be either an inner layer, an outer layer or both. In FIG. 4, line ZZ is the skin alone and line X is the elastomeric layer alone.

Another use for the invention laminate would be as an elasticized diaper fastening tab as per, e.g., U.S. Pat. No. 3,800,796, shown in FIG. 17. The preferential activation area zone 6 can be placed at the desired location while providing inelastic end portions 7. This tab could be cut from stock containing one or more preferential activation areas, zones or regions. Adhesive 8 could then be applied to one or more faces of the inelastic end portions 7 or over the entire laminate as discussed above.

An additional advantage with forming fastening tabs of the invention elastic is the versatility available. The tabs could be sold unstretched and easily activated by the customer, alternatively the tab could be used stretched and activated, in both cases the tacky rubber will not be exposed. An additional advantage with a stretched and activated tab is that the activated regions will have a surface microstructure which will tend to release adhesive tape at lower application pressures. This feature can be used to form tabs with a desirable centrally located mechanical low adhesion backsize region, which is desirable for fastening tabs such as those disclosed in U.S. Pat. No. 4,177,812 (Brown et al.).

The following Examples are provided to illustrate presently contemplated preferred embodiments and the best mode for practicing the invention, but are not intended to be limiting thereof. Examples 1 and 4–29 are examples of laminates suitable for post-formation treatment in accordance with the teachings of the invention.

EXAMPLE 1

A continuous coextrusion was carried out to prepare three-layer laminates with two outer layers of polypropylene and a core elastomeric layer of a styrene-isoprene-styrene block copolymer. A 2 inch (5.1 cm) screw diameter Berlyn™ extruder (Berlyn Corporation, Worchester, Mass.) was used to feed the elastomer layer (Kraton™ 1107, Shell Chemical Company, Beaupre, Ohio) and a Brabender™ 1.25 inch (3.18 cm) screw diameter extruder (available from C. W. Brabender Instruments, Inc., N.J.) was used to feed the two polypropylene (Escorene™ 3085, available from Exxon Chem. Corporation, Houston, Tex.) layers into the Cloeren™ feedblock, and were extruded through a single manifold 18 inch (46 cm) wide film die. The film was cast onto a 60° F. (16° C.) cast roll at 14.7 ft/min (509 cm/min) at varying total caliper as described in Table I. Films of varying outer layer thickness were prepared.

The films were tested for relaxation by initially uniaxially stretching, each sample by hand to just short of its breaking point, which was generally about 650%, releasing the sample, and observing any recovery. Recovery after initial draw was then categorized as instantaneous recovery (I), slow recovery with time (T), heat required for recovery (H) and permanent deformation (P), i.e. no significant recovery. Results are shown in the following table.

TABLE I

| SAMPLE NO. | TOTAL SKIN THICKNESS (microns) | CORE THICKNESS (microns) | CORE THICKNESS SKIN THICKNESS | RECOVERY | TEXTURE OF LAMINATE | % Change in Width upon Restretching sample | C.O.F. | Periodicity |
| --- | --- | --- | --- | --- | --- | --- | --- | --- |
| A | 5 | 90 | 18 | I | F | 1.4 | | — |
| B | 8 | 145 | 18 | I | F | 2.8 | 0.59 | 10μ |
| C | 12 | 175 | 14.6 | I | M | 2.0 | 0.67 | 45μ |
| D | 7 | 54 | 7.7 | I | F | 2.0 | | |
| E | 14 | 100 | 7.1 | T | C | 0 | 0.75 | 90μ |
| F | 8 | 48 | 6 | T-H | F | 0 | | |
| G | 20 | 45 | 2.25 | P | Smooth | Did not recover | | |

The texture of the laminate is evaluated both visually and by touch after recovery and classified as fine (F), medium (M), coarse (C) or smooth (no texture discerned). The texture was also measured objectively in samples B, C and E by the periodicity (distance between folds) of the samples. It was noted that as the regular folds get coarser, they also appear larger and more widely spaced. Although the large folds are more subject to having more random peak to peak distances, they are still quite regularly spaced.

The samples were also tested for necking characteristics expressed as % change in width upon restretching of the sample. Although necking was not significant for any of these samples, generally as skin thickness fell and the core to skin thickness ratio rose, necking increased.

Periodicity and C.O.F. are also shown for samples B, C and D which are both inversely related to the core/skin thickness ratio. The original C.O.F. for the samples was over 3.8, thus the microtexturing produced a significant overall reduction of C.O.F.

EXAMPLE 2

Strip coextruded samples were prepared using a modular three zone die. The two outer zones were fed with a 1.75 in(4.445 cm) Prodex™ (Prodex Corp., Fords, N.J., now H.P.M. Corp., Mt. Gilead, Ohio) extruder, while the center zone was fed with a 1.25 in(3.175 cm) Killion™ (Killion Extruders Inc., Cedar Grove, N.J.) extruder. The two skin and core compositions and extruder speeds are listed below.

| Sample #1 | Fina 3576 / | 98% Elvax 260 / 2% CBE 41055E | Fina 3576 |
|---|---|---|---|
| | Center Zone Extruder | | Outer Zone Extruder |
| | Zone 1: 149° C. | | Zone 1: 210° C. |
| | Zone 2: 177° C. | | Zone 2: 221° C. |
| | Zone 3: 193° C. | | Zone 3: 232° C. |
| | Screw Speed: 12 rpm | | Zone 4: 232° C. |
| | | | Screw Speed: 25 rpm |
| Sample #2 | Fina 3576 / | 49% Fina 3576 / 28% Himont 6723 21% Mineral Oil 2% CBE 41055E | Fina 3576 |
| | Center Zone Extruder | | Outer Zone Extruder |
| | Zone 1: 80° C. | | Zone 1: 210° C. |
| | Zone 2: 135° C. | | Zone 2: 221° C. |
| | Zone 3: 205° C. | | Zone 3: 232° C. |
| | | | Zone 4: 232° C. |
| Sample #3 | Fina 3576 / | 98% Kraton G-1657 / 2% CBE 24811S | Fina 3576 |
| | Center Zone Extruder | | Outer Zone Extruder |
| | Zone 1: 149° C. | | Zone 1: 210° C. |
| | Zone 2: 190° C. | | Zone 2: 221° C. |
| | Zone 3: 205° C. | | Zone 3: 232° C. |
| | Screw Speed: 5 rpm | | Zone 4: 232° C. |
| | | | Screw Speed: 40 rpm |
| Sample #4 | Elvax 260 / | 98% Elvax 240 / 2% CBE 41055E | Elvax 260 |
| | Center Zone Extruder | | Outer Zone Extruder |
| | Zone 1: 132° C. | | Zone 1: 138° C. |
| | Zone 2: 160° C. | | Zone 2: 165° C. |
| | Zone 3: 193° C. | | Zone 3: 188° C. |
| | Screw Speed: 5 rpm | | Zone 4: 199° C. |
| | | | Screw Speed: 50 rpm |
| Sample #5 | Elvax 450 / | 98% Elvax 260 / 2% CBE 41055E | Elvax 450 |
| | Center Zone Extruder | | Outer Zone Extruder |
| | Zone 1: 132° C. | | Zone 1: 115° C. |
| | Zone 2: 160° C. | | Zone 2: 165° C. |
| | Zone 3: 193° C. | | Zone 3: 188° C. |
| | Screw Speed: 5 rpm | | Zone 4: 199° C. |
| | | | Screw Speed: 71 rpm |
| Sample #6 | Elvax 750 / | 98% Kraton G-1657 / 2% CBE 24811S | Elvax 750 |
| | Center Zone Extruder | | Outer Zone Extruder |
| | Zone 1: 149° C. | | Zone 1: 115° C. |
| | Zone 2: 190° C. | | Zone 2: 165° C. |
| | Zone 3: 205° C. | | Zone 3: 188° C. |
| | | | Zone 4: 199° C. |

Fina™ 3576 is a 9 melt index(m.i.) polypropylene homopolymer, available from Fina Oil and Chem. Co., Deer Park, Tex. Himont™ 6723(available from Himont U.S.A., Inc., Wilmington, Del.) is a 0.8 m.i. polypropylene homopolymer. Elvax™ 240, 260, 450 and 750, vinyl acetate(VA)(43 m.i.), 28% VA(6 m.i.), 18% VA(8 m.i.) and 9% VA(7 m.i.), respectively, are ethyl vinyl acetates available from Dupont Corp., Wilmington, Del. CBE™ 41055E and 24811S are yellow and blue dyes in polyethylene(55%) and polystyrene(52%) carriers, respectively, available from C.B. Edwards and Co. Inc., Minneapolis, Minn. The mineral oil is Amoco™ White Oil RM 0009-8 available from Amoco Oil Co., Chicago, Ill.

EXAMPLE 3

The strip coextruded layers from Example 2 were formed into three layer laminates.

The constructions for the three layered laminates are set forth in Table II below where the sample numbers for the layers refer to the samples of Example 2.

TABLE II

| Laminate No. | Skin Layer | Core Layer | Skin Layer |
|---|---|---|---|
| i | S-1 | Kraton ™ 1657 | S-1 |
| ii | S-4 | Kraton ™ 1657 | S-4 |
| iii | S-2 | Kraton ™ 1657 | S-4 |
| iv | S-5 | Kraton ™ 1657 | S-5 |
| v | Fina 3576 | S-3 | Fina 3576 |
| vi | Fina 3576 | S-6 | Fina 3576 |
| vii | Elvax 750 | S-6 | Elvax 750 |

The laminate constructions and performances are schematically shown below. All samples were 25 mm wide and stretched to their natural draw ratio (NDR). The thicknesses of the individual layers in each zone were a mean value determined by optical microscopy at 250×. The overall laminate thickness was measured by a caliper gauge at the indicated locations. The length of the various zones is shown at initial and stretched (natural draw ratio) values.

The structural representation of the laminates shown below(the boxes) include in the boxes the caliper of the layers in each zone as measured by optical microscopy at 250×.

The values shown below the structural representation of the laminate are overall calipers measured by a caliper gauge at the indicated location.

Laminate i

| | Zone 1 | Zone 2 | Zone 3 |
|---|---|---|---|
| Initial | 25 mm | 20 mm | 25 mm |
| @NDR | 25 mm | 40 mm | 25 mm |

| | | 0.053 mm | 0.208 mm | | 0.069 mm | |
| | | 0.084 mm | 0.079 mm | | 0.084 mm | |
| | | 0.051 mm | 0.216 mm | | 0.071 mm | |
| (0.307) mm | (0.269) mm | (0.254) mm | (0.521) mm | (0.244) mm | (0.269) mm | (0.269) mm |

Laminate ii

| | Zone 1 | Zone 2 | Zone 3 |
|---|---|---|---|
| Initial | 25 mm | 22 mm | 25 mm |
| @NDR | 45 mm | 58 mm | 50 mm |

| | | 0.058 mm | 0.119 mm | | 0.058 mm | |
| | | 0.058 mm | 0.091 mm | | 0.076 mm | |
| | | 0.064 mm | 0.119 mm | | 0.056 mm | |
| (0.282) mm | (0.254) mm | (0.285) mm | (0.318) mm | (0.257) mm | (0.241) mm | (0.259) mm |

Laminate iv

| | Zone 1 | Zone 2 | Zone 3 |
|---|---|---|---|
| Initial | 25 mm | 17 mm | 25 mm |
| @NDR | 30 mm | 45 mm | 29 mm |

| | | 0.112 mm | 0.119 mm | | 0.081 mm | |
| | | 0.091 mm | 0.066 mm | | 0.091 mm | |
| | | 0.114 mm | 0.114 mm | | 0.114 mm | |
| (0.335) mm | (0.333) mm | (0.318) mm | (0.292) mm | (0.295) mm | (0.307) mm | (0.305) mm |

Laminate v

| | Zone 1 | Zone 2 | Zone 3 |
|---|---|---|---|
| Initial | 25 mm | 11 mm | 25 mm |

| -continued | | | | | | |
|---|---|---|---|---|---|---|
| @NDR | 25 mm | | 30 mm | | 25 mm | |
| | | 0.028 mm | 0.025 mm | | 0.020 mm | |
| | | 0.142 mm | 0.117 mm | | 0.089 mm | |
| | | 0.038 mm | 0.023 mm | | 0.028 mm | |
| (0.155) mm | (0.152) mm | (0.145) mm | (0.180) mm | (0.145) mm | (0.216) mm | (0.191) mm |

| Laminate vi | | | | | | |
|---|---|---|---|---|---|---|
| | Zone 1 | | Zone 2 | | Zone 3 | |
| Initial | 25 mm | | 9 mm | | 25 mm | |
| @NDR | 32 mm | | 27 mm | | 31 mm | |
| | | 0.036 mm | 0.028 mm | | 0.033 mm | |
| | | 0.114 mm | 0.196 mm | | 0.114 mm | |
| | | 0.033 mm | 0.023 mm | | 0.028 mm | |
| (0.216) mm | (0.208) mm | (0.155) mm | (0.249) mm | (0.145) mm | (0.216) mm | (0.249) mm |

| Laminate vii | | | | | | |
|---|---|---|---|---|---|---|
| | Zone 1 | | Zone 2 | | Zone 3 | |
| Initial | 25 mm | | 9 mm | | 25 mm | |
| @NDR | 30 mm | | 25 mm | | 28 mm | |
| | | 0.023 mm | 0.031 mm | | 0.025 mm | |
| | | 0.155 mm | 0.203 mm | | 0.140 mm | |
| | | 0.025 mm | 0.031 mm | | 0.025 mm | |
| (0.216) mm | (0.198) mm | (0.158) mm | (0.259) mm | (0.185) mm | (0.244) mm | (0.249) mm |

In sample iii, the skin layers separated in the transition region between zones on both sides of the laminate. In most instances where there was stretch in zones 1 and 3, this occurred almost exclusively in an area of these zones directly adjacent to zone 2. This was believed due to lower overall calipers noticed in these regions.

EXAMPLE 4

A multilayer laminate was prepared by laminating cast laminates of polypropylene/Kraton™ 1107/polypropylene. The total thickness of each cast laminate was 2.8 mil (0.062 mm). The core/skin ratio was 12:1. The laminated laminate was formed of 6 cast laminates in a hot press at 200° C. at 140 kilograms per square centimeter pressure for five minutes. The formed film was then cooled in a 21° C. water bath. The resulting laminate was 6 mil (0.15 mm) thick and appeared like the cast film but thicker. After stretching approximately 300% and instantaneous recovery, the film displayed a coarse microtextured skin and microtextured inner skin layers.

EXAMPLE 5

A continuous coextrusion was carried out to prepare three-layer laminates with two outer layers of a 70/30 by weight blend of poly(vinylidene fluoride) (Solef™ 1012, Solvay Co., France) and poly(methyl methacrylate) (VO44, Rohm and Haas Corp., Bristol, Pa.) and a core layer of Kranon 1107. A two inch (5.1 cm) diameter Berlyn™ screw extruder, at 10 RPM screw speed, was used to feed the core layer polymer and a 2 inch (5.1 cm) diameter screw Rheotec™ extruder, at 25 RPM, was used to feed the skin layer polymer blends into a Cloeren™ feedblock and the melt laminate was extruded through a single manifold die, 18 inches (46 cm) wide (Extrusion Dies, Inc., Chippawa Falls, Wis.), at 420° to 450° F. (215° to 232° C.) onto a 78° F. (26° C.) cast roll at 17.0 or 15.3 revolutions per minute (RPM), respectively. The film laminate thicknesses obtained were 5.5 and 6.0 mil (0.14 and 0.15 mm) with core/skin(single) ratios of 6:1 and 7.5:1, respectively.

Both laminates were stretched 400% and allowed to immediately recover. In each case, a laminate with a fine glossy microtextured surface was obtained.

EXAMPLE 6

A continuous coextrusion was carried out to prepare two distinct three-layer laminates with two outer layers of a 50/50 blend of two polybutylenes resins, Shell™ 0200 and Shell™ 0400, and a core elastomeric layer of Kraton™ 1107. A two inch (95.2 cm) diameter screw Berlyn™ extruder was used to feed the Kraton™ 1107 at a screw speed of 10 RPM. A 1.25 inch (3.18 cm) diameter Brabender™ screw extruder was used to feed the two polybutylene blend layers at screw speeds of 10 and 12 RPM into a Cloeren™ feed block. The laminates were extruded through a single manifold 18 inch (46 cm) wide film die at 430° F. (221° C.) onto a 60° F. (16° C.) cast roll at either 8.8 or 7.6 ft/min(2.7 or 2.3 m/min), maintaining a total caliper of 0.003 inches (0.076 mm) for both samples. This produced two films of varying outer skin thicknesses with the same total laminate thickness. The core/skin ratios were 13:1 and 5:1, respectively.

Also, the same equipment was run at a Brabender™ extruder speed of 35 RPM and a cast roll speed of 8.6 ft/min(2.6 m/min), all other conditions the same as above, to give a 0.005 inch (0.127 mm) thick laminate (comparative) with thick overall skin layers, and a core/skin ratio of 2.6:1.

The texture for each sample was noted after each laminate was, stretched by hand just short of its breaking point, about 4:1, and allowed to recover, the first two runs instantly and the third (comparative) with heat. The textures were classified as very fine, fine and none. This data is shown in Table III below.

TABLE III

| Brabender™ Speed (RPM) | Cast Roll Speed (cm/min) | Total Film Thickness (cm) | Texture |
|---|---|---|---|
| 10 | 268 | 0.0081 | very fine |
| 12 | 232 | 0.0081 | fine |
| 35 | 262 | 0.013 | none |

EXAMPLE 7

A continuous coextrusion was carried out to prepare five-layer laminates with two outer layers of linear low density polyethylene, tie layers of ethylene vinyl acetate, Elvax™ 260(EVA) (available from Dupont Corporation, Wilmington, Del.) and a core elastomer layer of styrene-isoprene-styrene block copolymer. A two inch (5.1 cm) screw diameter, 4D ratio Berlyn™ extruder was used to feed the elastomer layer (Kraton™ 1107). A Rheotec™ two inch (3.18 cm) screw diameter extruder was used to feed the two polyethylene layers, and a one inch (2.54 cm) screw diameter 3M made extruder was used to feed the two Elvax™ layers into a Cloeren™ feedblock.

The laminates were extruded through a single manifold 18 inch (46 cm) wide film die at 375° F. (190° C.) onto a 60° F. (16° C.) cast roll at varying total caliper or thickness as described in Table IV. Films of varying layer thickness were thus prepared. This example also demonstrates how casting roll speed affects film thickness.

The EVA tie layers add bonding strength between the LLDPE outer layers and the SIS core layer, resulting in a more durable laminate than such a film without the EVA, yet do not interfere with the way the laminate behaves with respect to surface texture. These tie layers are, of course, very thin compared to the other layers.

This data is indicative of the large drop in the coefficient of friction for the stretched film compared to its unstretched precursor and is also indicative of the unique microtextured surface of laminates of the present invention.

TABLE IV

PROCESSING CONDITIONS FOR SAMPLES

| NO. | BERLYN+ RPM | RHEOTEC++ RPM | CASTING ROLL SPEED (RPM) | NIPP ROLL SPEED (RPM) | FILM THICK-NESS (microns) | SUR-FACE* TEXT-URE | 1" EXT.' RPM |
| --- | --- | --- | --- | --- | --- | --- | --- |
| 7A | 30 | 8 | 15 | 15 | 132.0 | F | 24 |
| 7B | 30 | 8 | 15 | 15 | 132.0 | F | 24 |
| 7C | 30 | 8 | 7 | 7 | 272.0 | MF | 20 |
| 7D | 30 | 8 | 4 | 4 | 508.0 | C | 20 |
| 7E | 30 | 8 | 14 | 14 | 124.0 | F | 20 |
| 7F | 30 | 8 | 25 | 25 | 71.0 | VF | 20 |
| 7G | 30 | 8 | 48 | 48 | 25.4 | SF | 20 |

+Berlyn ™ extruder temperature same for all samples: Zone 1 = 149° C., Z2 = 177, Z3 = 193, Z4 = 204, Z5 = 204, Z6 = 204
++Rheotec ™ extruder temperature same for all samples: Zone 1 = 110° C., Z2 = 149, Z3 = 149, Z4 = 160

'1" (2.54 cm) extruder temperature same for all runs: Zone 1 = 143° C., Z2 = 191, Z3 = 191
*F = Fine microtexture, MF = medium fine, VF = very fine, SF = super fine, C = coarse Since the extruder conditions were close to constant for all of the above runs, the core thickness to skin thickness ratio will be the same for all of the above runs, approximately 13:1 as will be the core/tie layer ratio at 30:1. Thus, it will be noted that the total film thickness column of Table IV correlates exactly with the surface texture column. The range of values goes from a total film thickness of 1.0 mil (25 microns) and a texture of super fine, to 20.0 mil (508 microns) and a texture of coarse, all from a stretch of 5:1 and an instantaneous recovery. Thus, it can be seen that the thicker materials give coarser textures and that by controlling the physical parameters, the texture can be controlled.

EXAMPLE 8

A three-layer LLDPE/SIS/LLDPE film was made as in the previous examples using a Berlyn™ extruder with a screw speed of 20 RPM to feed the Kraton™ 1107, and a Brabender™ extruder with a screw speed of 17 RPM to feed the Dow Chemical Co. (Rolling Meadows, Ill.) 61800 linear low density polyethylene to a Cloeren™ feedblock. The laminate was extruded through a single manifold 18 inch (46 cm) wide film die onto a casting roll at 85° F. (29° C.), and a speed of 13.7 ft/min(4.18 m/min) to give a laminate with a core/skin ratio of 15.6:1 and a total thickness of 125 microns. The film was uniaxially stretched 4:1 and instantaneously recovered, the coefficient of friction of the film, to itself, was measured from the stretched and recovered film, and compared to the unstretched film. The data is shown in Table V. MD denotes Machine direction and TD denotes transverse direction.

TABLE V

| Sample | Static COF | Dynamic COF |
| --- | --- | --- |
| unstretched MD | 4.5 | 4.2 |
| unstretched TD | 4.6 | 3.7 |
| stretched MD | 0.4 | 0.3 |
| stretched TD | 0.5 | 0.5 |

EXAMPLE 9

A three-layer laminate of the present invention was made using the set-up of Example 8. The Berlyn™ extruder, operating at a screw speed of 10 RPM, was used to feed a polyurethane (Pellethane™ 2102-75A from Dow Chemical Co., Midland, Mich.) core material. The Brabender™ extruder operating at a screw speed of 7 RPM was used to feed a blend of Amoco™(Amoco Oil Co., Chicago, Ill.) 3150B high density polyethylene (HDPE) and Kraton™ 1107 in a 95:5 ratio, as the skin material, to the Cloeren™ feedblock. The small amount of Kraton™ 1107 was added to the skin layer to increase the adhesion of the skin layer to the core layer. The laminate was extruded through a single manifold, 18 inch (46 cm) wide, film die onto a casting roll at a temperature of 70° F. (21° C.) and a speed of 21 ft/min(6.4 m/min) to give a 69 micron laminate with a core/skin ratio of 13.7:1. The laminate exhibited a microtextured surface after stretching 600% and instantaneous recovery.

EXAMPLE 10

A three-layer laminate of the present invention was made using the set up of Example 8. The Berlyn™ extruder operating at a screw speed of 60 RPM was used to feed a triblock copolymer elastomer of styrene-butadiene-styrene (SBS) (Kraton™ 1101) as a core material, and a Killion™ extruder was used to feed a Dow™ 3010 LLDPE material to a Cloeren™ three layer die. The extrudate was cast upon a casting roll at a temperature of 85° F. (29° C.) and a speed of 41 ft/min (12.5 meters/minute). The resulting 5 mil (0.127 mm) thick film with a core/skin ratio of 8.9:1 was easily stretched 7.5:1 and upon instantaneous recovery a fine textured laminate was formed.

EXAMPLE 11

A three-layer laminate, of the present invention, made using the set up of Example 4, with the Berlyn™ extruder feeding a Kraton™ G 2703 styrene-ethylene butylene-styrene (SEBS) block copolymer at a screw speed of 20 RPM, and the Brabender™ extruder feeding an Exxon™ PP-3014 polypropylene at a screw speed of 5 RPM, to a Cloeren™ feedblock. This material was then extruded through a 18 inch (46 cm) film die onto a casting roll at a temperature of 34° F. (1.1° C.). The film produced was easily stretched 600% and formed a fine textured surface after it was allowed to recover instantaneously. The layer thicknesses determined under a light microscope were 15/162/12 microns skin/core/skin, respectively.

EXAMPLE 12

This example demonstrates the use of varying skin and core materials. In all runs, the line conditions were identical using a Cloeren™ feedblock at 400° F. (204° C.). The core extruder was the Brabender™ discussed above with temperatures in zones 1–4 of 178, 210, 210 and 216° C. respectively. The die was at 400° F. (204° C.) and the casting wheel at 51° F. (11° C.).

TABLE VI

| # | CORE | SKIN | CORE SKIN RATIO | % STRETCH | SHRINK-AGE | TEXTURE |
|---|---|---|---|---|---|---|
| 12A | Kraton ™ 1107 | ELVAX ™ 360 | 9.6 | 700 | I | F |
| 12B | Kraton ™ 1107 | (Polyester) (Eastabond ™ FA-300) | 4.4 | 600 | I | F |

12A in Table VI demonstrates that elastomers can be used for the skin when a more elastic core is used and with appropriate stretch for a 115 micron film. 12B demonstrates the use of a polyester skin in a 120 micron film. The laminate designated 12B, despite the relatively large core to skin ratio, the skin was of a relatively fine texture and instant shrink recovery. This is due primarily to the low modulus of the polyester. FA-300 is available from Eastman Chem. Co., Kingsport, Tenn.

EXAMPLE 13

Nylon 66 (Vydyne™ 21 of the Monsanto Co., St. Louis, Mo.), the condensation product of adipic acid and hexamethylene diamine, was used as the skin in accordance with the procedure outlined in Example 8. The core was a SIS (Kraton™ 1107) block copolymer. The nylon and Kraton™ were extruded at 525° F. (274° C.) and 450° F. (232° C.), respectively into a 500° F. (260° C.) die. A 4 mil (0.1 mm) thick film was formed with a core to skin ratio of 18:1. A microtextured surface formed after a 4:1 stretch and instant recovery.

EXAMPLE 14

In order to increase the tackiness of the core and lower core layer modulus and decrease its viscosity, a solid tackifying rosin Wingtack™ (Goodyear Chem Co., Akron, Ohio) was blended with Kraton™ 1107 in ratios of 10/90, 20/80 and 30/70 using the arrangement of the previous example, in 91, 114 and 165 micron films, respectively. The die temperature was 380° F. (193° C.) with the Kraton™ blend fed at a rate of 18.5 pounds/hour (0.14 kg/min) and the polyethylene skin (LLDPE; Dowlex™ 2500, Dow Chemical) fed at a rate of 6 pounds/hour(2.72 kg/hr). The core to skin ratios were 6.2:1. For all three Kraton™ blends a fine microtextured surface of the laminate was obtained when a 6:1 stretch was employed and gave instant shrink recovery.

EXAMPLE 15

The relationship between skin thickness and percent stretch to surface ,texture (measured by periodicity) was explored using a SEBS core (Kraton™ G1657) and a polypropylene skin (Exxon™ 3085). The Berlyn™ extruder was used for the core and the Rheotec™ extruder was used for the skin, fed into a Cloeren™ feedblock. A single layer drop die was used at 420° F. (216° C.), the casting roll operated at 38.9 ft/min(11.9 m/min.) and 50° F. (10° C.). The results are shown in Table VII below.

TABLE VII

| # | AVG. SKIN THICKNESS (μ) | CORE/ SKIN RATIO | STRETCH % | PERIODICITY (μ) | SHRINK MECHANISM |
|---|---|---|---|---|---|
| 15A | 14 | 6 | 600 | 29 | I |
|  |  |  | 250 | 56 | I |
| 15B | 17.5 | 6.1 | 550 | 39 | I |
|  |  |  | 350 |  |  |
| 15C | 21 | 4.4 | 550 | 46 | H |
|  |  |  | 350 | 71 | H |
| 15D | 20 | 4.3 | 550 | 47 | H |
|  |  |  | 300 |  |  |
| 15E | 23 | 3.7 | 500 | 63 | H |
|  |  |  | 350 | 69 | H |

As the stretch percent increased for each sample, the periodicity decreased indicative of the finer microtexturing obtained. This shows that stretch percent can be used to vary the surface structure of the laminate.

Further, as skin thickness increased so did the periodicity.

In all samples, the core thickness was approximately constant at 85μ's. Skin thickness on a constant core can thus be directly related to the surface exture obtainable. As can be seen in the above Table IV, for relatively constant stretch % as the skin thickness increased so did the periodicity. The thick skinned samples thus produced coatset textures. This can of course be used to manipulate the skin and hence laminate characteristics.

EXAMPLE 16

The sample tested was that prepared in Example 8 the stretch ratio was varied from 2:1 to 13:1.

TABLE VIII

| Stretch ratio | Periodicity (μ) | % Area Increase |
| --- | --- | --- |
| 2 | (random wrinkles) | |
| 3 | 30 | |
| 4 | 12 | |
| 5 | 10 | 280 |
| 6 | 8 | |
| 7 | 7 | |
| 8 | 6.5 | 390 |
| 9 | 6 | |
| 10 | 5.5 | |
| 11 | 5 | |
| 12 | 4 | 530 |
| 13 | 3 | |

As can be seen from Table VIII, the relationship between stretch ratio and periodicity demonstrated in Example 15 holds up for this LLDPE/SIS/LLDPE laminate. As the stretch ratio increases, the periodicity decreases first rapidly, then slowly in a substantially exponential manner. Further, the increase in area increases with an increase in stretch ratio.

EXAMPLE 17

The relationship between stretch, core/skin ratio and shrink mechanism was demonstrated using the procedure of Example 4 and Example 15 for polypropylene/Kraton™ 1657 (SEBS)/polypropylene laminates. The material was stretched at the rate of 5 cm/sec. and held for 15 seconds. The film was allowed to shrink for 20 seconds and then heat shrunk in a water bath for 5 seconds at 160° F. (71.1° C.).

The length of the film after shrink was then compared to the length of the film after the 20 second hold period and the length after stretch to determine the shrink mechanism in operation. The results of this comparison are in Table IX below.

TABLE IX

| CORE/SKIN RATIO | STRETCH RATIO(S) | SHRINK MECHANISM |
| --- | --- | --- |
| 6.0 | 3.8/5.3/6.2 | I |
| 5.3 | 4.6/5.3 | S |
| | 6.5 | I |
| 5.1 | 4.3/5.0 | H |
| | 5.5 | S |
| | 6.8 | I |
| 4.8 | 4.2/4.0 | H |
| | 6.0 | T |
| | 6.5 | F |
| 4.0 | 4.0/5.2/6.0 | H |
| 3.7 | 4.2–6.8 | H |
| 3.4 | 4.0 | N |
| | 4.7–6.0 | H |

TABLE IX-continued

| CORE/SKIN RATIO | STRETCH RATIO(S) | SHRINK MECHANISM |
| --- | --- | --- |

N = None,
H = Heat,
S = Slow time,
T = Time,
F = Fast time
I = Instant

Fast is when more than 15% recovery occurred at 5 seconds. Medium time is where greater than 15% recovery occurred at 20 seconds. Slow time is where greater than 15% recovery was not noted until 60 seconds after stretch.

EXAMPLE 18

Polypropylene (Exxon™ 3145) was added to a Kraton™ 1107 (SIS) elastomer as a modifier for the core material. The skin used was an Exxon™ 3014 polypropylene (PP). The cores prepared contained 5 and 10 percent Exxon™ 3145 polypropylene by weight. The relationship between stretch, the shrink mechanism and texture was tested. The results are in the following Table.

TABLE X

| Core/Skin Ratio = 6.9, 112 microns thick, 10% PP in Core | | | | |
| --- | --- | --- | --- | --- |
| % Stretch | 320 | 410 | 510 | 590 |
| Shrink Mechanism | None | None | Heat | Heat |
| Texture | — | — | Coarse | Coarse |
| Core/Skin Ratio = 8.0, 125 microns thick, 10% PP in Core | | | | |
| % Stretch | 280 | 380 | 480 | 570 |
| Shrink Mechanism | None | None | Heat | Heat |
| Texture | — | — | Coarse | Coarse |
| Core/Skin Ratio = 8.8, 84 microns thick, 5% PP in Core | | | | |
| % Stretch | 270 | 320 | 400 | 500 | 590 |
| Shrink Mechanism | Heat | Heat | Heat | Slow Time | Fast Time |
| Texture | Coarse | Coarse | Coarse | Med | Fine |

As can be seen the addition of PP to the core decreases the shrinkability of the laminate. The polypropylene appears to reduce the elasticity of the core thereby permitting the restraining forces of the skin to more easily dominate the elastic strain imposed by the deformed elastic core.

EXAMPLE 19

Figure 8:
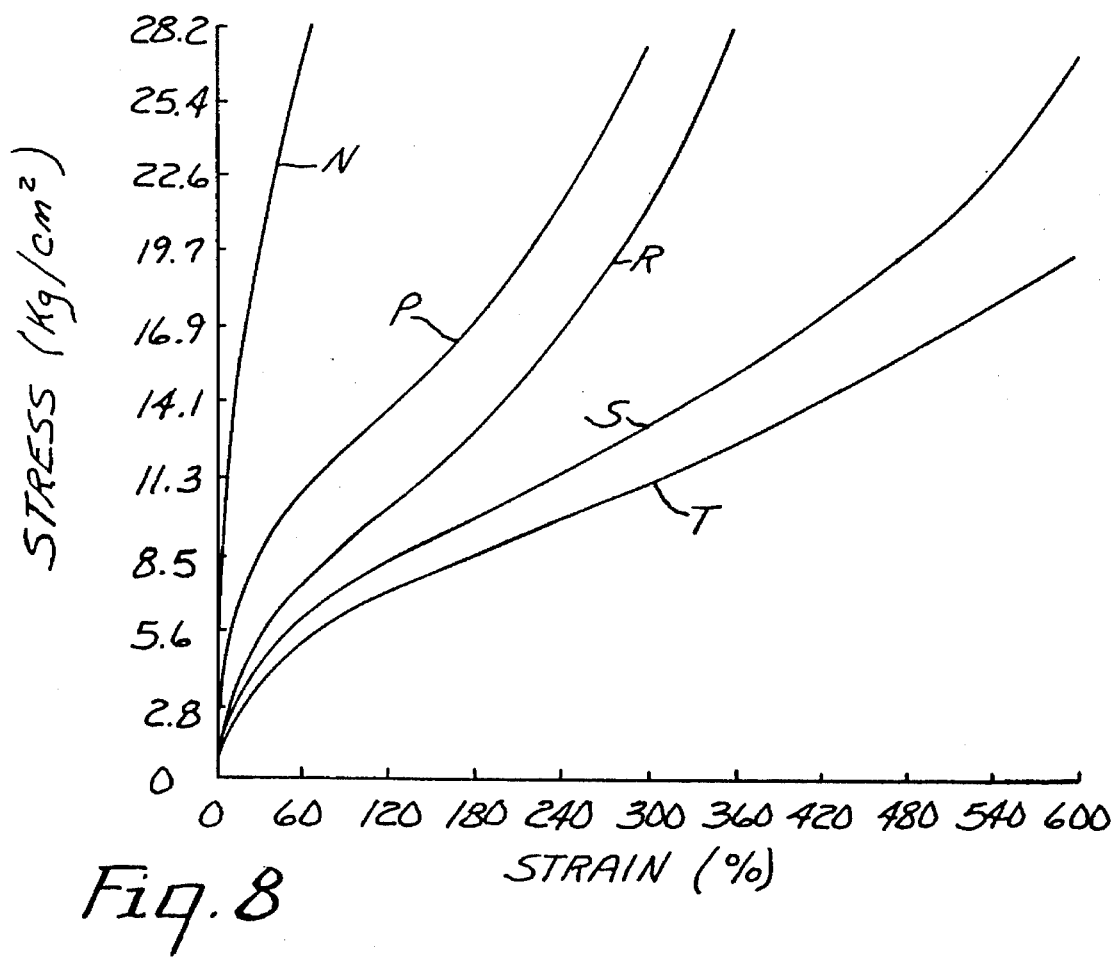
FIG. 8 (T-N) are stress/strain curves for a series of laminate films.

The effect of adding a stiffening aid, polystyrene, to an elastomeric core material was tested. The skin comprised a linear low density polyethylene (Dowlex™ 6806). The core was a blend of SIS (Kraton™ 1107) and polystyrene (500PI or 685W, both from Dow Chemical Co.). All samples were of a 3-layer construction (skin/core/skin) with a total thickness of 4.5 mil (0.11 mm) and a core/skin ratio of 8:1. All samples were then stretched 400% and instantaneously recovered. Tensile curves were then generated which demonstrated that the laminates became stiffer with increasing polystyrene content (as shown in FIG. 8 (T-N), shown also in the following Table XI.

TABLE XI

| SAMPLE # | % P.S. (Type) | 5% YOUNGS MODULUS (kg/cm$_2$) |
| --- | --- | --- |
| 19A(T) | 0 | 11.5 |

TABLE XI-continued

| SAMPLE # | % P.S. (Type) | 5% YOUNGS MODULUS (kg/cm$_2$) |
|---|---|---|
| 19B(S) | 10 (500 PI) | 20.7 |
| 19C(R) | 30 (500 PI) | 29.4 |
| 19D(P) | 40 (685 W) | 68.6 |
| 19E(N) | 50 (685 W) | 188.4 |

EXAMPLE 20

In this example, the effect of the addition of WingtacK tackifier to the core elastomer was investigated. The laminate material of Example 14 was compared to a three-layer laminate (20) comprising LLDPE/Kraton™1107/LLDPE. Both samples were 4 mil (0.10 mm) in total thickness with core/skin ratios of approximately 8:1. These materials were of the instant shrink type when stretched from 4:1 to 13:1.

TABLE XII

| EXAMPLE | 5% YOUNGS MODULUS |
|---|---|
| 20 (Comp) | 109 kg/sq. cm. |
| 14 | 47.9 kg/sq. cm. |

As can be seen from Table XII, the use of a viscosity reducing aid/tackifier has the opposite effect as the addition of a polystyrene stiffening aid.

EXAMPLE 21

A 2 layer laminate of a core and one skin layer was formed of Kraton™ 1107 (SIS)/Exxon™ polypropylene 3014. A Berlyn™ extruder operating at 6 RPM was used with the polypropylene and the Killion™ extruder operating at 125 RPM was used for the Kraton™. The polymers were fed to an 18 inch (45.7 cm) 440° F. (227° C.) Cloeren™ die with one manifold shut down. The resulting film was cast on a roll at 60° C. and rotating at 35.2 RPM. The laminate formed was 2 mil (0.051 mm) thick with a core/skin ratio of 2.5:1 and exhibited a coarse microtexture when stretched 5:1 and allowed to recover instantly. Necking on subsequent restretching was only 2.5%.

EXAMPLE 22

A laminate was formed having skins of different compositions. The elastic core was Kraton™ 1107 with one polyethylene (Dow™ LLDPE 61800) and one polypropylene (Exxon™ 3085) skin. The core was extruded with a Berlyn™ extruder while the skins were extruded with Rheotec™ and Brabender™ extruders, respectively. The Cloeren™ die was at 350° F. (177° C.) and the casting roll at 60° F. (16° C.). Two films were formed. For the first, the extruders operated at 20, 8 and 26 RMP's respectively while the cast roll operated at 17.3 RPM to form laminates with core/skin ratios of 18:1. The sample formed was instant shrink at a 5:1 stretch, with a fine microtexture. For the second film, the extruders and cast roll operated at 10, 16, 26 and 14.2 RMP's respectively to form a laminate with a core/skin ratio of 18:1. The second laminate was also instant shrink at 5:1 stretch yet exhibited coarse surface texture. Both laminated were 4.0 mil (0.1 mm) thick.

EXAMPLE 23

Figure 10:
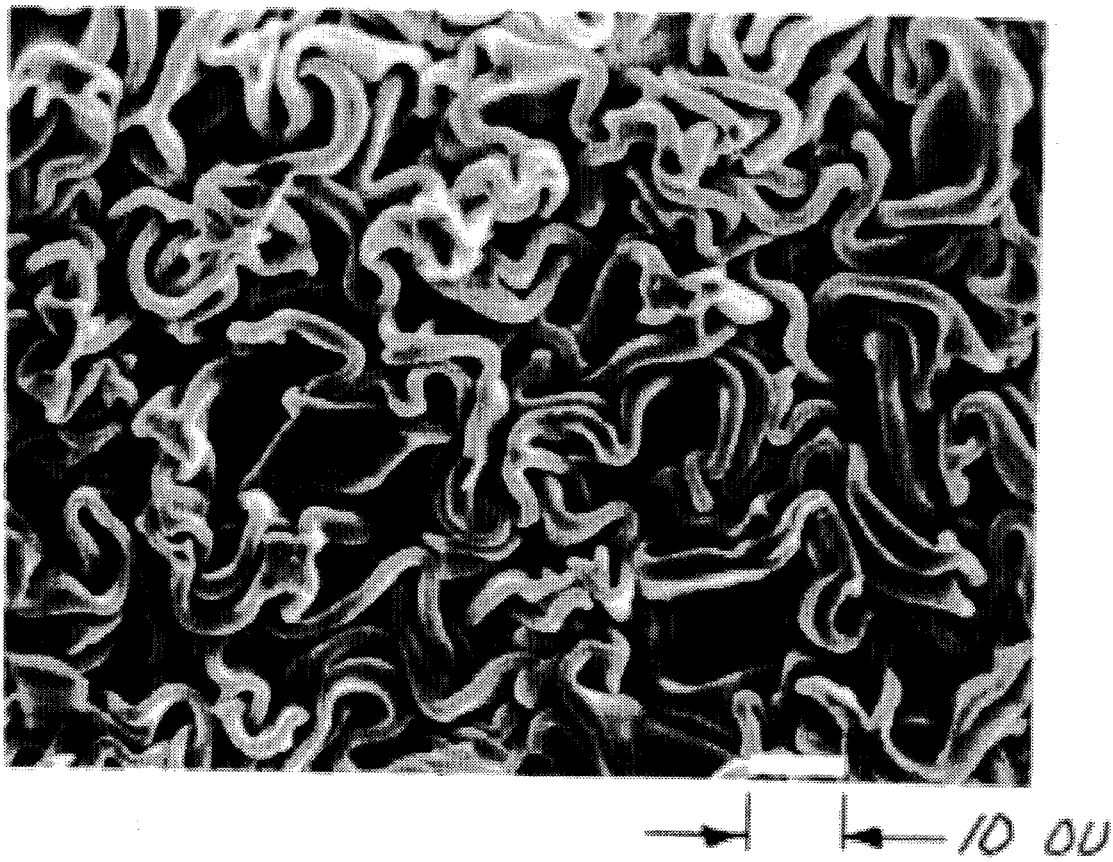
FIG. 10 is a scanning electron micrograph (100×) of a simultaneously biaxially stretched invention laminate which has a polypropylene skin.

The laminate of Example 1A was stretched in a first direction at 4:1 and sequentially in a cross direction by 4:1 and simultaneously biaxially at 4:1 by 4:1. The laminates were of the instant shrink type. The texture formed is shown in FIGS. 9 and 10, respectively.

EXAMPLE 24

A three-layer laminate of polypropylene/SEBS(Kraton™ 1657)/polypropylene used in Example 17 was tested for writability. The core/skin ratio was 5:1 with a total laminate thickness of 5 mil (0.13 mm). The film was stretched to 5:1 and allowed to recover. The writability before and after stretching is shown in FIGS. 6 and 7, respectively.

EXAMPLE 25

A series of LLDPE/SIS/LLDPE laminates were compared for their non-necking characteristics, as shown in Table XIII below.

TABLE XIII

| # | C/S RATIO | STRETCH RATIO | THICKNESS (microns) | % WIDTH CHANGE |
|---|---|---|---|---|
| A | 8.75 | 5:1 | 215 | 2.8 |
| B | 6.0 | 5:1 | 120 | 3.2 |
| C | 6.7 | 5:1 | 78 | 5.2 |
| D | 15.3 | 7:1 | 100 | 10.0 |
| E | 21.2 | 8:1 | 132 | 33.3 |
| F | PURE SIS | 5:1 | | 50.0 |
| G | PURE SIS | 7:1 | | 62.5 |
| H | PURE SIS | 8:1 | | 70.8 |

SIS was tested for comparison purposes. As the C/S ratio and stretch ratios rose, the problems with necking increased.

EXAMPLE 26

The use of adhesive cores was demonstrated. First a copolymer of isooctyl acrylate (IOA) and acrylic acid (AA) in monomer ratios of (90/10) was used as a core with polypropylene (Exxon™ 014) and PET (intrinsic TM, viscosity 0.62) as the skins in the first two examples. The IOA/AA copolymer was prepared in accordance with U.S. Pat. No. 4,181,752. The core/skin ratios and total thicknesses were 20 and 10, and 22 mil (0.56 mm) and 6 mil (0.15 mm) before lamination for the PP and PET examples, respectively. The laminates were cured for 5 minutes using a 15 watt UV light to cure the cores. The PP skin embodiment was an instant shrink at 500% stretch while the PET skin embodiment was a heat shrink laminate at 400% stretch.

PET was also used as a skin layer for a Kraton™ 1107 (56 parts) Wingtack Plus™ (35 parts) and Wingtack™ 10 (9 parts) core with a core/skin ratio of 83.1 and a total thickness of 25.6 mil (0.65 mm) before lamination. This laminate was of the instant shrink type at 400% stretch.

EXAMPLE 27

This example demonstrates skin controlled relaxation in the heat shrink region and control of the heat shrink mechanism by % elongation and core/skin ratio. A series of 5 mil(0.12 mm) laminates were made with a core of Kraton™ 1107 (89 parts) poly(alpha-methyl)styrene (PAMS) (10 parts) and Irganox™ (Ciba-Geigy Corp., Hawthorne, N.Y.) (1 part-antioxidant). The skins were polypropylene (Exxon™ 3085). A Berlyn™ extruder was used for the core and Rheotec™ extruders for the skin using a Cloeren™ three-layer feedblock and a 18 inch (45.7 cm) film die. The cast wheel temperature was 80° F. (27° C.) with the speed determined by the core/skin (C/S) ratio and the skin extruder speed. The shrink mechanism as a function of C/S ratio and % stretch is shown in FIG. 11. Fast is when more than 15% recovery. occurred at 5 seconds. Medium time is where greater than 15% recovery occurred at 20 seconds. Slow time is where greater than 15% recovery was not noted until 60 seconds after stretch.

Figure 12:
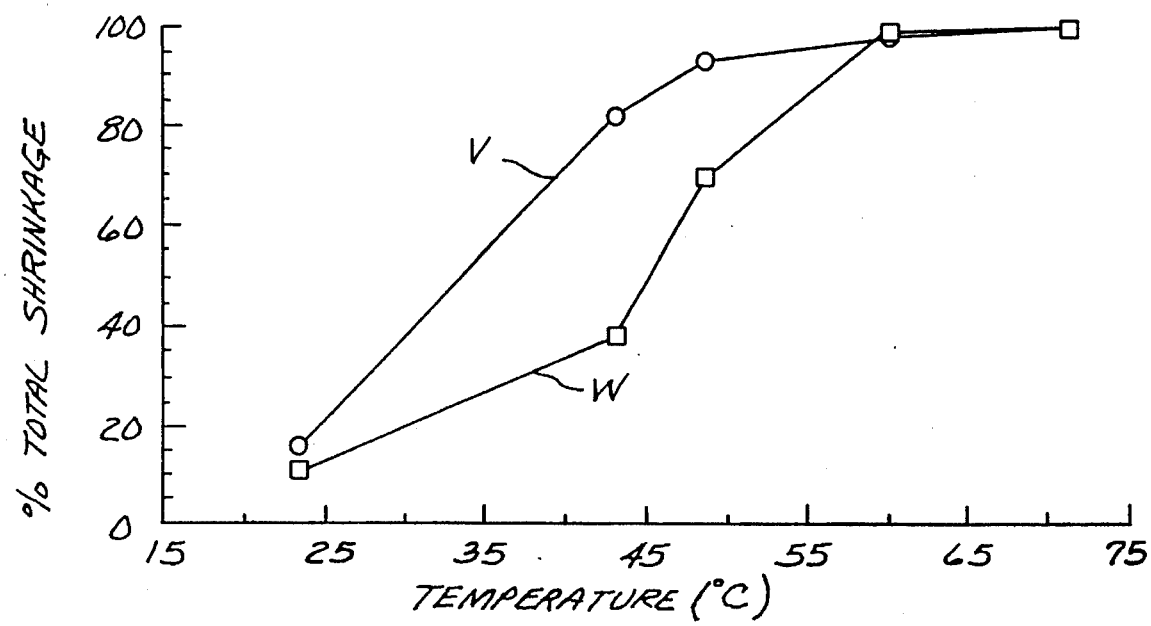
FIG. 12 is a diagram showing the relationship between the core/skin ratio, the percent of total recovery and activation temperature.

Skin control of the temperature of activation for the heat shrink material is demonstrated in FIG. 12. The temperature of activation is defined as the temperature required to achieve 50% or 90% of the recovery obtainable. Lines V and W represent samples with core/skin ratios of 4.71 and 4.11, respectively. As is seen, as the core/skin ratio went down the temperature of activation (both $T_{a-90}$ and $T_{a-50}$) went up, indicating a skin controlled relaxation. In this Figure, the 100% value is defined as the % shrinkage at 160° F. (71° C.), which for most practical purposes was the upper limit of available recovery. The points below 80° F. (27° C.) are the amounts of preactivation shrinkage for each example.

Three samples were also tested for increase in opacity from the unstretched clear film as seen in Table XIV below.

EXAMPLE 30

A laminate sample, similar to Example 27, having skin/core ratio of 8.28 and of the instant shrink type, was annealed. The sample was mounted onto a sheet of white paper having alternating zones of black and white. The so-mounted sample was then placed in an overhead transparency maker, 3M Model 4550 AGA(available from 3M Co., St. Paul, Minn.), at setting 2(relating to the speed at which the sample goes through the machine) and exposed. The sample was exposed to a 1350 watt bulb which melted the skin layers at this setting(T>185° C.) The transparency maker heated the laminate surface adjacent the dark lines, thus annealing the sample. The sample was annealed to give 25%, 50%, 75% and 100% overall annealing as per FIG. 13. One inch (2.54 cm) wide stripes were tensile tested according to ASTM D 882. The jaw gap was 4 inches (10.15 cm) with a crosshead speed of 20 inches (50.8) cm)/min. The tensile curves are shown in FIGS. 14 (A)–(C). A summary of the data is set forth in Table XV below.

TABLE XIV

| CORE*/SKIN RATIO | % STRETCH | TEXTURE | SHRINK MECHANISM | OPACITY AS CAST | OPACITY ACTIVATED |
| --- | --- | --- | --- | --- | --- |
| 4.71 | 300 | C | H | 2.42% | 30.4% |
| 4.97 | 700 | F | I | 2.08 | 37.5 |
| 5.0 | 300 | C | H | 3.40 | 35.8 |

*The core had a ½% blue pigment.

EXAMPLE 28

A foamed core three-layer film was made. The skins were Dow™ LLDPE 6806 and the core was 99.5% Kraton™1107

TABLE XV

| Sample | Prim. Yield (Kg/cm²) | Prim. Yield (% E) | Young's Modul. (Kg/cm²) | Load @ 500% El. (Kg) | Second. Yield (Kg/cm²) | Second. Yield (% E) |
| --- | --- | --- | --- | --- | --- | --- |
| As Cast | 42.5 | 16.3 | 1.12 | 2.09 | — | — |
| 25% | 46.2 | 11.0 | 1.43 | 2.05 | 49.6 | 174 |
| 50% | 48.0 | 9.9 | 1.39 | 2.14 | 51.3 | 115 |
| 75% | 50.5 | 9.0 | 1.58 | 2.00 | 53.1 | 93 |
| 100% | 56.3 | 13.5 | 1.59 | 2.04 | — | — | with 0.5% AZNP 130 blowing agent (Uniroyal Chemical Co., Naugatuck, Conn.). Total film thickness was 20 mil (0.5 mm). The skins were 2.0 mil (0.05 mm) thick each. The foamed core specific gravity was 0.65 as compared to unfoamed Kraton™ specific gravity of 0.92. A three-layer coextrusion die was used. This was an instant shrink sheet exhibiting a coarse texture at about 300% stretch.

EXAMPLE 29

The film with a core/skin ratio of 6:1 was characterized for its unstretched and stretched modulus value, the results of which are shown in FIG. 4; X is the Kraton™ 107 elastomer alone, ZZ is the polyethylene skin alone, Z is the laminate as cast and Y is the laminate after stretching to 500% and recovery.

Figure 16:
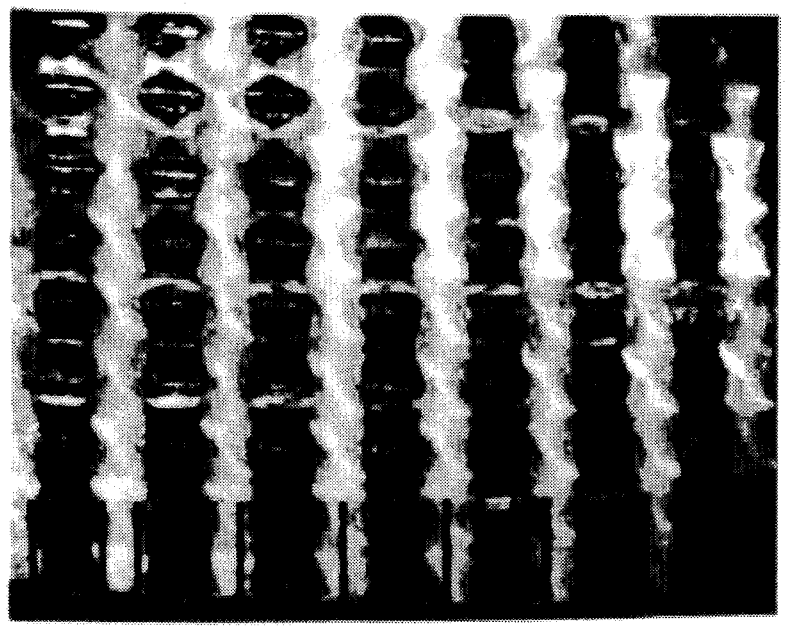
FIG. 16 is a light micrograph of a relaxed sample annealed with a regular repeating diamond pattern.

The sample was annealed at a lower setting (4.5-faster) with a diamond pattern. A thermometer ran through the machine at this setting read 180° C. The sample was stretched and relaxed and formed a complex yet repeating macrostructured surface as shown in FIG. 16 (The marks at the bottom of the figure represent millimeters.).

Figure 15A:
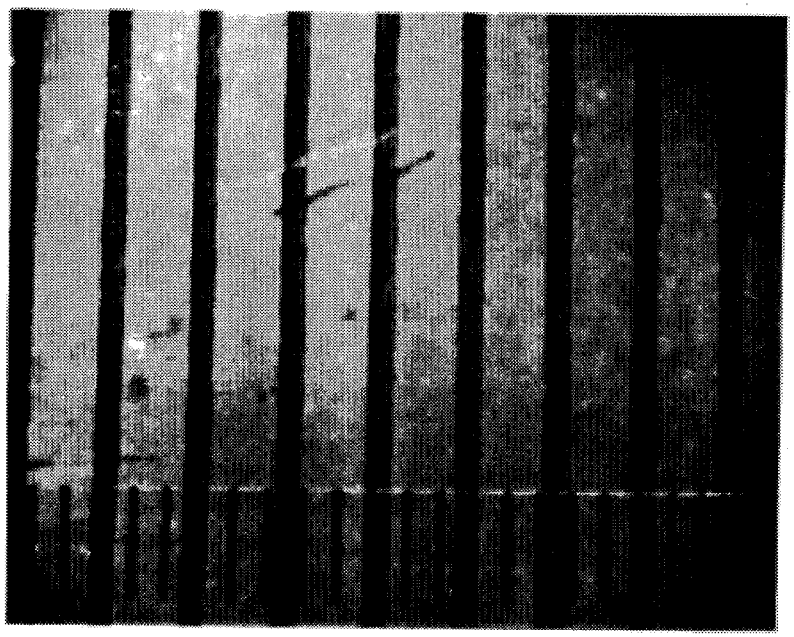
FIGS. 15 (A)–(C) are light micrographs of a 25% annealed sample of FIG. 13 as cast, stretched and relaxed, respectively.
Figure 15B:
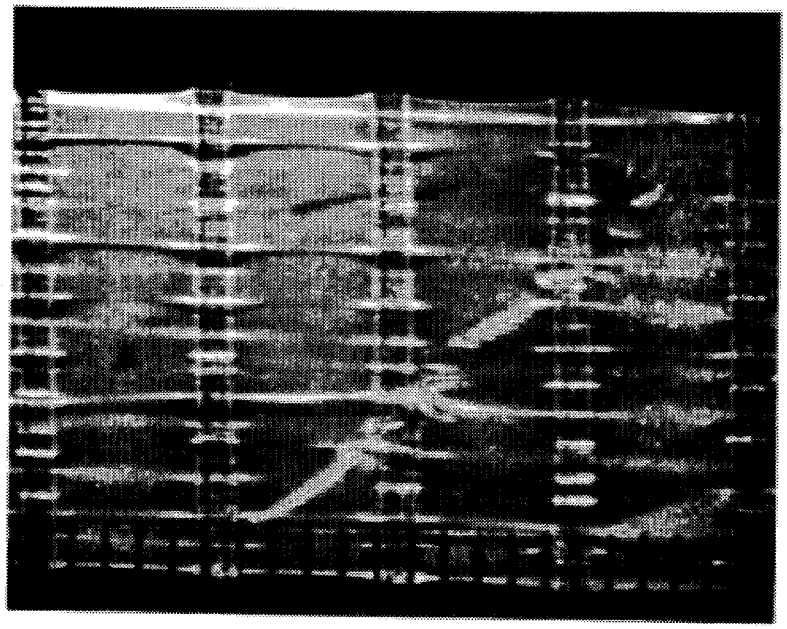
Figure 15C:
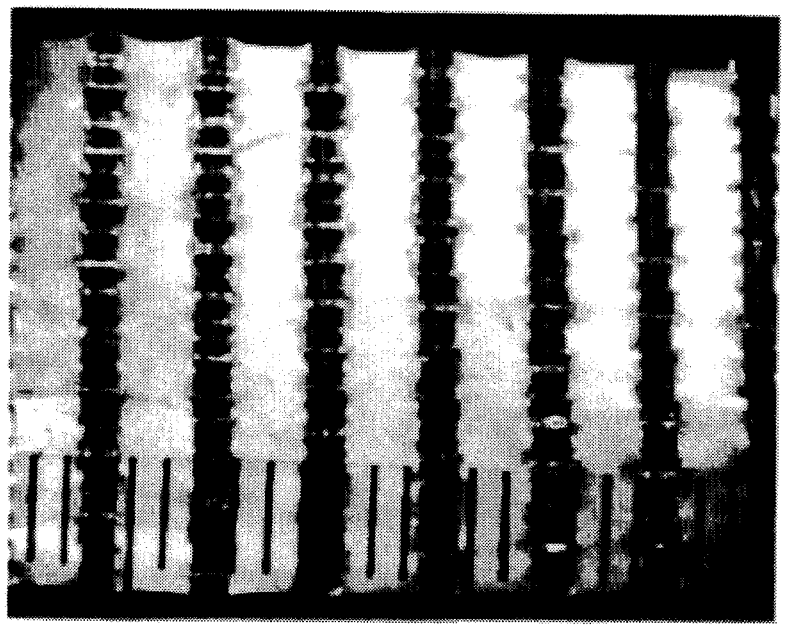

FIGS. 15 (A)–(C) are a series of scanning electron micrographs of the 25% annealed sample as cast, stretched to its natural draw ratio and relaxed. The samples were prepared at the 4.5 setting discussed above. This series of figures shows the preferential elongation in the unannealed zones. This preferential strain is also summarized in Table XVI below.

TABLE XVI

| Samples | Total Stretch (%) | Am. Stretch (%) | Cryst. Stretch (%) |
|---|---|---|---|
| 25% Crys. | 100 | 120 | 25 |
| 50% Crys. | 70 | 162 | 23 |
| 75% Crys. | 77 | 200 | 22 |

The samples above were stretched to the point where the crystalline material was about to stretch. The percentages represent the amounts that each region and the overall composite stretched at this point.

COMPARATIVE EXAMPLE 1

A three-layer film of Dow™ LLDPE 2517 (Polyethylene)/Pebax™ (available from Autochem Co., France) 3533/Dow™ LLDPE 2417 was made. The film was formed by pressing three precursor films together at 400° F. (204° C.) and about 2000 pounds of pressure (140 kg/sq.cm) for 5 minutes. The film formed was 5 mil (0.13 mm) thick with a core/skin ratio of 12.7. The laminate was stretched 400% (from 1 to 5 cm). The stretched laminate then contracted to 3.2 cm (36% of stretched length) at room temperature. The relaxed laminate was then heat shrunk by 180° F. (82° C.) air, and it contracted to 1.5 cm (53% of relaxed length). An edge of the sample was then cut and observed for microtexturing. No folds were observed at 1000× magnification. Microscopic bumps, probably formed by recompression of the cover layer, and skin delamination was observed. The COF and opacity for the cast laminate was 0.901 and 2.77% while that for the relaxed activated laminate was 0.831 and 12.4%, respectively.

EXAMPLE 31

The material from Example 15 was scored a multitude of times using a dull edged roller, by hand. This produced indentations in the laminate. When the laminate was elongated 100% and instantaneously recovered, elastic activation occurred in the regions around the score lines. This is significant in that ordinarily this material must be elongated by 300% or more to get a uniform draw and activation.

EXAMPLE 32

A film laminate of PP(EXXON 3085)/SIS(Kraton™ 1107)/PP was treated by corona discharge. The SIS core contained 1% pigment, 1% Irganox 1076(Ciba Geigy Inc., Hawthorne, N.Y.) and 10%(based on the elastomer and the PAMS) Exxon PAMS 18-210. The overall caliper of the laminate was 3.6 mils(0.0914 mm) with a core/skin ration of 5.1:1. The laminate was corona treated at 100° F. (37.8° C.) and relative humidity. A corona operating at 1.86 KW, per side, was used to treat the laminate running at less than 10 feet (3.05 m) per minute. The line speed was slowed down by hand(approximately 7 feet/min (2.13 m/min)) to create regions of heavy corona treatment and light corona treatment. The areas of heavy corona treatment preferentially activated.

EXAMPLE 33

The film laminate of Example 32 was treated on the same line without slowing the line down to cause ablation. The temperature was the same and the relative humidity was 50%. The laminate was taken off normal to the line and at a sharp angle(approximately 110°) to create micro cracks. When stretched the laminate activated preferentially in the areas where microcracks were formed.

EXAMPLE 34

The film laminates of certain examples were examined to determined the contact mechanism between the skin and core layers. The stretched and activated samples were cut with a razor blade on a hard surface. The samples were then examined at the cut edges with a scanning electron microscope. The core skin contact was then determined visually with the results summarized in Table XVII below.

TABLE XVII

| Pat Ex | Composition | Stretch Ratio | Comments |
|---|---|---|---|
| 5 | PVDF + PMMA/SIS/PVDF + PMMA | 2:2 | Elastic cohesive failure |
| 6 | PB/SIS/PB | 3 | Elastic cohesive failure |
| 7 | PE/EVA/SIS/EVA/PE | 5 | Adhesive failure |
| 12A | EVA/SIS/EVA | 4 | Adhesive failure |
| 12B | FA300SIS/FA300 | 7 | Adhesive failure |
| 19E | PE/SIS + PS/PE | 3 | Some voids |
| 8 | LLDPE/SIS/LLDPE | 3 | Filled |
|  |  | 5 | Filled |
|  |  | 7 | Filled |
| 15A | PP/SEBS/PP | 4 | Filled |
| 15C | PP/SEBS/PP | 5.3 | Elastic cohesive failure |
| A | PP/SIS/PP |  | Filled |

New sample A corresponds to Example 27. Sample A had approximately the caliper of the Example 27 sample with a core/skin ratio of 5.1 and was a heat shrink laminate.

EXAMPLE 35

A sample having the layer composition of Example 27 (with 1% blue pigment in the core) was formed with an overall caliper of 2.98 mils (0.076 mm) and a core/skin ratio of 5.14. The film was cast onto a chrome casting wheel with a rubber nip. The 60° gloss was measured using ASTM D2457-70 using a Gardner Instruments(Bethesda, Md.) 60° gloss tester. The result's are summarized in Table XVIII below for the as cast and three microtextured films (with different stretch rates).

TABLE XVIII

|  |  | 60° Gloss | |
|---|---|---|---|
|  |  | MD | TD |
| As Cast | Chrome Side | 8.6 | 8.8 |
|  | Rubber Side | 3.4 | 3.3 |
| 300% | Chrome Side | 2.1 | 3.5 |
|  | Rubber Side | 1.5 | 1.9 |
| 400% | Chrome side | 2.0 | 6.6 |
|  | Rubber Side | 1.6 | 2.4 |
| 500% | Chrome Side | 2.2 | 3.0 |
|  | Rubber Side | 1.6 | 1.8 |

The various modifications and alterations of this invention will be apparent to those skilled in the art without departing from the scope and spirit of this invention, and this invention should not be restricted to that set forth herein for illustrative purposes.

We claim:

1. A method of forming a zone activatable inelastic laminate comprising the steps of providing a multilayer laminate of elastomeric core and thermoplastic skin layers and treating said laminate at certain regions in one or more layers to provide preferential activation zones wherein said preferential activation zones will preferentially elongate and recover to form an elastic zone.

2. The method of claim 1 wherein said laminate is treated to have regions with lower composite modulus values, than adjacent regions.

3. The method of claim 2 wherein said lower modulus regions are provided by annealing adjacent regions.

4. The method of claim 1 wherein said laminate is treated to have preferential stress regions.

5. The method of claim 4 wherein said preferential stress region is created by corona discharge treatment.

6. The method of claim 5 wherein said corona discharge treatment comprises treating regions of the laminate below the corona saturation point and generating microcracks, in said region by uniform deformation of said laminate.

7. The method of claim 6 wherein said uniform deformation is provided by a sharp takeup angle of said laminate from a surface.

8. The method of claim 5 wherein said corona treatment comprises exposing said laminate to above saturation discharge levels to ablate material from one or more layers of said laminate.

* * * * *

UNITED STATES PATENT AND TRADEMARK OFFICE
CERTIFICATE OF CORRECTION

PATENT NO.: 5,468,428

DATED: November 21, 1995

INVENTOR(S): Thomas P. Hanschen et al.

It is certified that error appears in the above-identified patent and that said Letters Patent is hereby corrected as shown below:

Col. 1, Line 36, "the . other" should read --the other--;
Col. 1, Line 40, "can.poten-" should read --can poten----;
Col. 2, Line 36, "Set." should read --Ser.--;
Col. 5, Line 41, "plaSticizers" should read --plasticizers--;
Col. 6, Line 19, "entiblocking" should read --antiblocking--;
Col. 6, Line 38, "skfn" should read --skin--;
Col. 7, Line 21, "Qne" should read --one--;
Col. 7, Line 22, delete the "," after "which";
Col. 7, Line 24, "Where" should read --where--;
Col. 7, Line 56, "as" should read --is--;
Col. 10, Line 12, "saturatioh" should read --saturation--;
Col. 11, Line 41, "zone" should read --Zone--;
Col. 11, Line 45, "zone" should read --Zone--;
Col. 12, Line 64, "Weisnet" should read --Weisner--;
Col. 13, Line 36, "Coke" should read --Core--;
Col. 14, Line 36, "heat." should read --heat--;
Col. 14, Line 40, "iS" should read --is--;
Col. 14, Line 44, insert a "," after "A-A'";
Col. 16, Line 18, "regionS," should read --regions,--;
Col. 17, Line 13, "(LLDPE)/SIS/LLDpe" should read --(LLDPE)/SIS/LLDPE--;
Col. 17, Line 17, "30" should read --530--;
Col. 18, Line 18, "athleticiwraps" should read --athletic wraps--;
Col. 18, Line 57, "Where" should read --where--;
Col. 19, Line 17, "modified.to" should read --modified to--;
Col. 21, Line 55, "750, vinyl" should read --750, 28% vinyl--;
Col. 22, Table II, under "Skin Layer" delete the second "S-4" and insert --S-2--;
Col. 22, Line 29, "representatien" should read --representation--;
Col. 23, Line 58, "Kranon" should read --Kraton--;

UNITED STATES PATENT AND TRADEMARK OFFICE
CERTIFICATE OF CORRECTION

PATENT NO.: 5,468,428

DATED: November 21, 1995

INVENTOR(S): Thomas P. Hanschen et al.

It is certified that error appears in the above-identified patent and that said Letters Patent is hereby corrected as shown below:

Col. 24, Line 32, "was," should read --was--;
Col. 25, Line 4, "hot" should read --not--;
Col. 25, Table IV, delete the "" after "EXT.";
Col. 28, Line 36, ",texture" should read --texture--;
Col. 29, Line 3, "exture" should read --texture--;
Col. 29, Line 6, "coatset" should read --coarser--;
Col. 31, Line 14, "WingtacK" should read --Wingtack™--;
Col. 32, Line 42, "(Exxon™ 014)" should read --(Exxon™ 3014)--;
Col. 32, Line 42, "(intrinsic TM," should read --(intrinsic--;
Col. 32, Line 61, ".example" should read --example--;
Col. 33, Line 8, "recovery." should read --recovery--;
Col. 33, Line 64, "107 should read --1107--;
Col. 34, Line 3, "having skin/" should read --having a skin/--;
Col. 35, Line 53, "and relative" should read --and 53% relative--;
Col. 36, Line 47, "result's" should read --results--;

Signed and Sealed this

Twenty-eighth Day of January, 1997

Attest:

BRUCE LEHMAN

Attesting Officer   Commissioner of Patents and Trademarks